(12) United States Patent
Selvanayagam et al.

(10) Patent No.: US 9,999,968 B2
(45) Date of Patent: Jun. 19, 2018

(54) TOOL HOLDER

(71) Applicant: Black & Decker Inc., Newark, DE (US)

(72) Inventors: Shinthujan Selvanayagam, Harrow (GB); Markus Rompel, Runkel (DE)

(73) Assignee: Black & Becker Inc., New Britain, CT (US)

( * ) Notice: Subject to any disclaimer, the term of this patent is extended or adjusted under 35 U.S.C. 154(b) by 37 days.

(21) Appl. No.: 14/742,787

(22) Filed: Jun. 18, 2015

(65) Prior Publication Data
US 2015/0375384 A1 Dec. 31, 2015

(30) Foreign Application Priority Data

Jun. 26, 2014 (GB) .................................. 1411392.2

(51) Int. Cl.
*B25D 17/08* (2006.01)
*B23B 31/107* (2006.01)

(52) U.S. Cl.
CPC ........ *B25D 17/088* (2013.01); *B23B 31/1071* (2013.01); *B25D 2217/0042* (2013.01);
(Continued)

(58) Field of Classification Search
CPC .......... B25D 17/088; B25D 2217/0042; B25D 2250/231; Y10T 279/17076; Y10T 279/17094
See application file for complete search history.

(56) References Cited

U.S. PATENT DOCUMENTS 4,434,859 A * 3/1984 Rumpp ................... B23Q 3/12
173/114
4,830,549 A * 5/1989 Neumaier ............ B25D 17/088
173/104
(Continued)

FOREIGN PATENT DOCUMENTS

DE 3319934 A1 * 12/1983 ............... B23Q 3/12
DE 33 28 886 A1 2/1984
(Continued)

OTHER PUBLICATIONS

Michael Coja, European Search Report, dated Nov. 6, 2015, The Hague.
(Continued)

*Primary Examiner* — Eric A Gates
(74) *Attorney, Agent, or Firm* — Amir R. Rohani

(57) ABSTRACT

A tool holder for a power tool comprising: a body defining a passageway in which a shank of a cutting tool can be located; at least one axial locking element moveably mounted within the body and which is capable of being moved between and held in at least a first release position and a second locking position where it projects into the passageway where it is capable of engagingly a shank of a cutting tool when located within the passageway in order to axially restrict the movement of the shank in the passageway; and at least one axial guide moveably mounted within the body and which can be moved between and held in at least two positions, including one position where it projects into the passageway where it is capable of engagingly supporting a side of a shank of a cutting tool when located within the passageway.

24 Claims, 20 Drawing Sheets

(52) U.S. Cl.
CPC . *B25D 2250/231* (2013.01); *Y10T 279/17076* (2015.01); *Y10T 279/17094* (2015.01)

(56) References Cited

U.S. PATENT DOCUMENTS

| | | | | |
|---|---|---|---|---|
| 6,092,814 | A * | 7/2000 | Kageler | B25D 17/088 279/14 |
| 8,005,570 | B2 * | 8/2011 | Gloden | B23B 31/1071 403/31 |
| 2005/0285355 | A1 * | 12/2005 | Lin | B23B 31/1071 279/81 |
| 2006/0192350 | A1 * | 8/2006 | Kleine | B25D 17/088 279/19.3 |
| 2009/0160138 | A1 * | 6/2009 | Bohne | B23B 31/1071 279/30 |
| 2010/0059943 | A1 * | 3/2010 | Norton | B23B 31/22 279/72 |

FOREIGN PATENT DOCUMENTS

| | | | | |
|---|---|---|---|---|
| DE | 3328886 A1 * | 2/1984 | ........... | B25D 11/005 |
| DE | 34 21 811 A1 | 12/1985 | | |
| DE | 19525915 A1 * | 1/1997 | ........... | B25D 17/088 |
| DE | 19604283 A1 * | 8/1997 | ........... | B25D 17/088 |
| DE | 102004016014 A1 * | 10/2005 | ......... | B23B 31/1071 |
| DE | 10 2007 005033 A1 | 8/2008 | | |
| DE | 102013216535 A1 * | 2/2015 | ............ | B23B 31/02 |
| EP | 0456003 A1 * | 11/1991 | ......... | B23B 31/1238 |
| EP | 0556713 A2 * | 8/1993 | ............... | B23Q 3/12 |
| EP | 0 976 506 A1 | 2/2000 | | |
| EP | 1 695 797 A2 | 8/2006 | | |
| JP | 59030607 A * | 2/1984 | ........... | B25D 11/005 |
| JP | 62074510 A * | 4/1987 | ........... | B25D 17/088 |
| JP | 01016383 A * | 1/1989 | ........... | B25D 17/088 |

OTHER PUBLICATIONS

Annex to the European Search Report on European Patent Application No. EP 15 17 2266, dated Oct. 30, 2015.

* cited by examiner

TOOL HOLDER

CROSS-REFERENCE TO RELATED APPLICATIONS

This application claims priority to UK Application No. GB 1411392.2, filed on Jun. 26, 2014, entitled "A Tool Holder." The content of this application is incorporated herein by reference in its entirety.

FIELD OF THE INVENTION

The present invention relates to a tool holder for a drill, such as a hammer drill.

BACKGROUND OF THE INVENTION

Hammer drills are power tools that can often operate in three modes of operation. A hammer drill will comprise a tool holder in which a cutting tool, such as a drill bit, can be supported and driven by the hammer drill. The hammer drill can actively drive the cutting tool in three different ways, each being referred to as a mode of operation. The cutting tool can be driven in a hammering mode, a rotary mode and a combined hammer and rotary mode. A hammer drill will typically comprises an electric motor and a transmission mechanism by which the rotary output of the electric motor can either rotationally drive the cutting tool to perform the rotary mode or repetitively strike the cutting tool to perform the hammer mode or rotationally drive and repetitively strike the cutting tool to perform the combined hammer and rotary mode.

EP1157788 discloses a typical hammer drill.

BRIEF SUMMARY OF THE INVENTION

Cutting tools for hammer drills typically comprise two sections: a first section which connects to a tool holder of a hammer drill and a second section which performs the cutting task of the cutting tool when driven by the hammer drill. The design of first section can vary.

FIG. 1 shows one design of a first section 20 of a cutting tool which is referred to as a hex shank cutting tool. The first section 20 of the shank of the hex shank cutting tool comprises two sub sections 2, 4 which have a hexagon cross section and which are separated by a circumferential groove 6 of circular cross section. The dimensions of the first section 20 of the hex shank cutting tool are fixed in accordance with a set standard.

FIG. 2 shows another design of a first section 22 of a cutting tool which is referred to as a SDS plus shank cutting tool. The first section 22 of the shank of the SDS plus shank cutting tool is circular in cross section and has two grooves 10 located on opposite sides of the shank which extend axially to the rear of the shank and two elongate axial recesses 12 located between the grooves on opposite sides of the shank. The dimensions of the first section 22 of the SDS plus shank cutting tool are fixed in accordance with a set standard.

Different types of tool holders are presently required for use with cutting tools having different designs of first sections. This results in the requirement to provide a number of tool holders for each hammer drill in order for the hammer drill to be able to utilize different types of cutting tool. This increases cost as well as requiring the user to swop tool holders when different designs of cutting tool are to be utilized. Furthermore, tool holders of hammer drills are typically incorporated into the design of the hammer drill in an integral manner and therefore cannot be simply be detached and interchanged with another tool holder. This results in a user having to have several hammer drills, each having a different tool holder to hold different designs of cutting tools. Alternatively, if the user only wanted to use a single hammer drill, the user would need to utilize an adaptor to alter the function of the existing tool holder to accommodate the different designs of cutting tool, incurring extra cost and complexity.

The object of the present invention is to provide a tool holder which is capable of supporting and driving cutting tools which have at least two different designs of first section for connecting the cutting tool to the tool holder.

Accordingly, there is provided a tool holder in accordance with claim 1.

BRIEF DESCRIPTION OF THE DRAWINGS

Three embodiments of the present invention will now be described with reference to accompanying drawings of which:

FIG. 20B shows a cross section of tool holder of FIG. 20A in the direction of Arrows G;

DETAILED DESCRIPTION OF THE INVENTION

Figure 1:
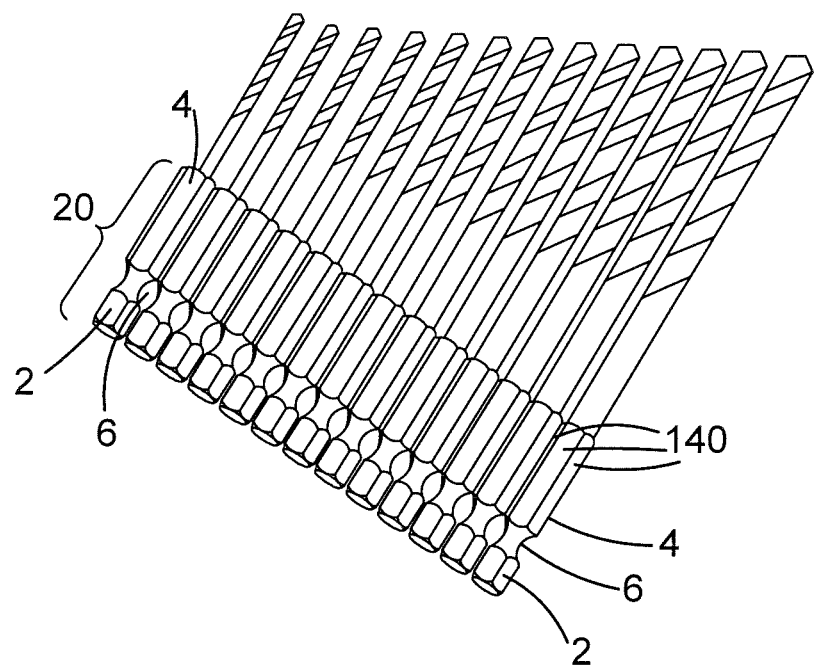
FIG. 1 shows a hex shank cutting tool.
Figure 2:
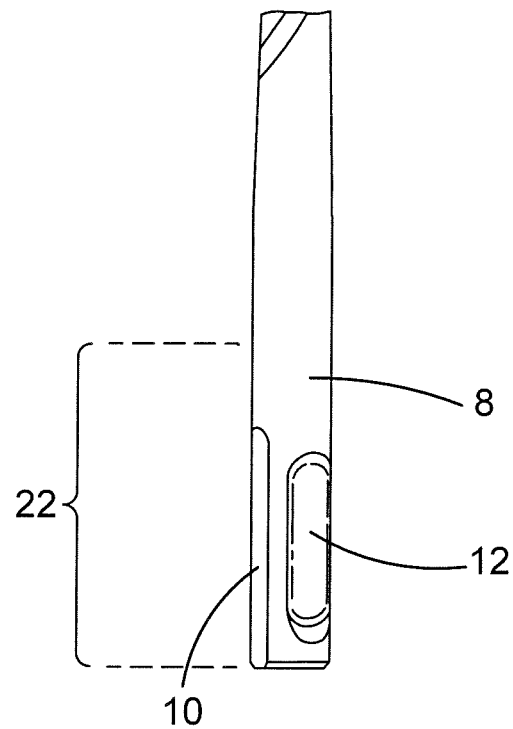
FIG. 2 shows a SDS plus cutting tool.
Figure 3:
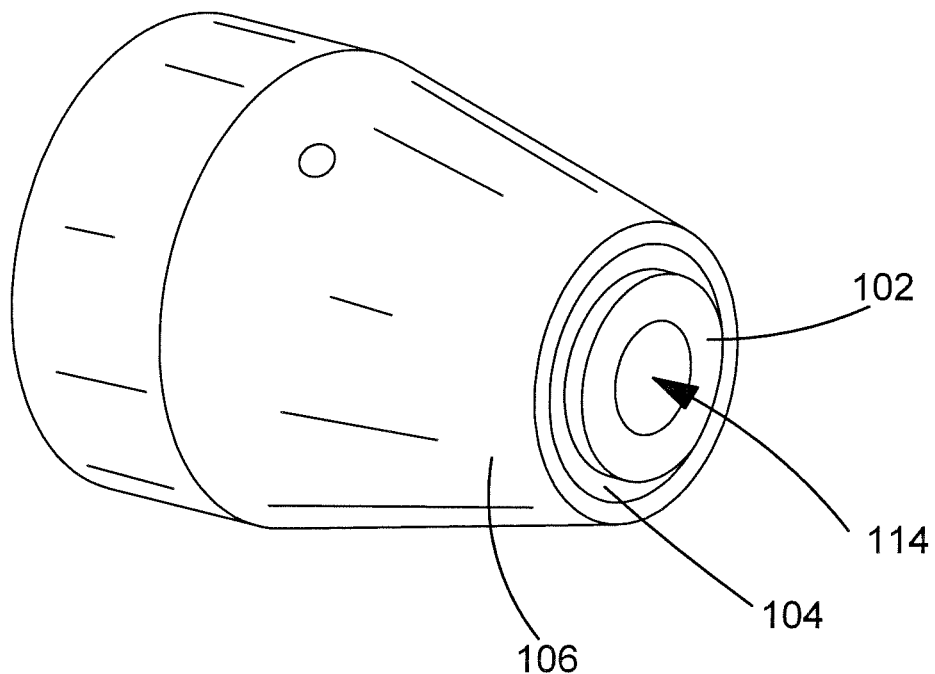
FIG. 3 shows a side view of the first embodiment of the tool holder.

The hammer drill disclosed comprises a tubular spindle 100 which is capable of being rotatably driven by an electric motor (not shown) to perform the rotary mode of operation. The front end 102 of the spindle 100 comprises a tubular passage 114 which is adapted to receive a first section of a cutting tool and forms part of a tool holder of the hammer drill. Rotation of the spindle 100 results in rotation of a cutting tool when held within the front end 102. A ram (not shown) and a beat piece (not shown) are slideably supported within the spindle 100. The ram can be reciprocatingly driven within the spindle 100 by a reciprocating piston (not shown) via an air spring and which repetitively strikes the beat piece which beat piece in turn repetitively strikes the end of a cutting tool when held in the tool holder.

The first embodiment of the tool holder will now be described with reference to FIGS. 3 to 10.

The tool holder comprises the front end of the spindle 102, a first inner sleeve 104 and a second outer sleeve 106.

Figure 4:
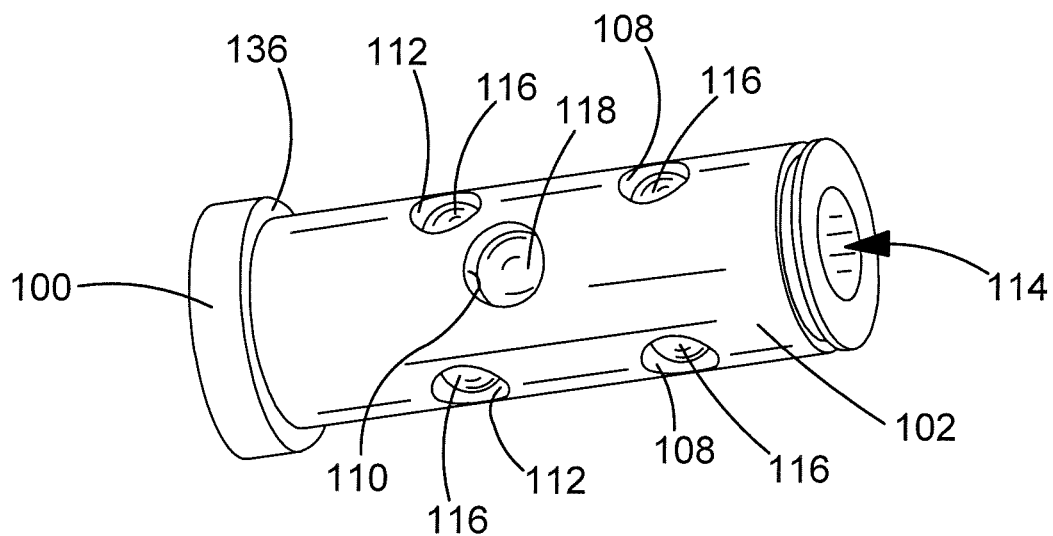
FIG. 4 shows the front end of the spindle of a hammer drill with the positioning ball bearings and locking ball bearing in their respective apertures.

FIG. 4 shows the tubular front end 102 of the spindle 100 with the inner and outer sleeves 104, 106 removed which is formed by a wall of uniform thickness. The front end 102 comprises seven circular apertures 108, 110, 112 formed through the sides walls of the front end 102. The apertures 108, 110, 112 are arranged in two sets of three 108, 112 with the seventh 110 located between the two sets 108, 112. Each set 108, 112 of three comprises three apertures located at the same axial position as each other along the spindle and arranged angularly about the longitudinal axis of the front end 102 at 120 degrees relative to each other in a symmetrical fashion. The apertures 108, 112 in each set are angularly aligned with the apertures in the other set 108, 110. The diameter of each aperture 108, 112 in both sets are all the same as each other. The seventh aperture 110 is located axially between the two sets 108, 112 and angularly between two adjacent apertures in each set. The diameter of the seventh aperture is slightly larger than that of the six apertures in the two sets 108, 112.

Six positioning ball bearings 116 are located within the two sets 108, 112 of three apertures, each having the same diameter. The diameter of the cross section of each of the six apertures 108, 112 is slightly reduced at the entrance to the six apertures 108, 112 formed in the inner wall of the front end 102 where the apertures 108, 112 meet the tubular passage 114 to prevent the positioning ball bearings 116 from exiting the apertures 108, 112 and entering the tubular passage 114 whilst allowing part of the sides of positioning ball bearings 116 to project into the tubular passage 114 from the apertures. The diameter of the support ball bearings 116 is greater than the thickness of the wall of the front end 102 and therefore a part of the sides of the positioning ball bearings 116 either project into the tubular passage 114 or project radially outwardly from the front end 102.

A seventh locking ball bearing 118 is located within the seventh aperture 110. The diameter of the seventh ball bearing 118 is larger than that of the six positioning ball bearings 116. The diameter of the cross section of each of the seventh aperture 110 is slightly reduced at the entrance to the seventh aperture 110 formed in the inner wall of the front end 102 where the aperture 110 meets the tubular passage 114 to prevent the ball bearing 118 from exiting the aperture 110 and entering the tubular passage 114 whilst allowing part of the side of the locking ball bearing 118 to project into the tubular passage 114 from the aperture 110. The diameter of the ball bearing 118 is greater than the thickness of the front end 102 and therefore a part of the side of the ball bearing 118 either projects into the tubular passage 114 or projects radially outwardly from the front end 102.

Figure 5:
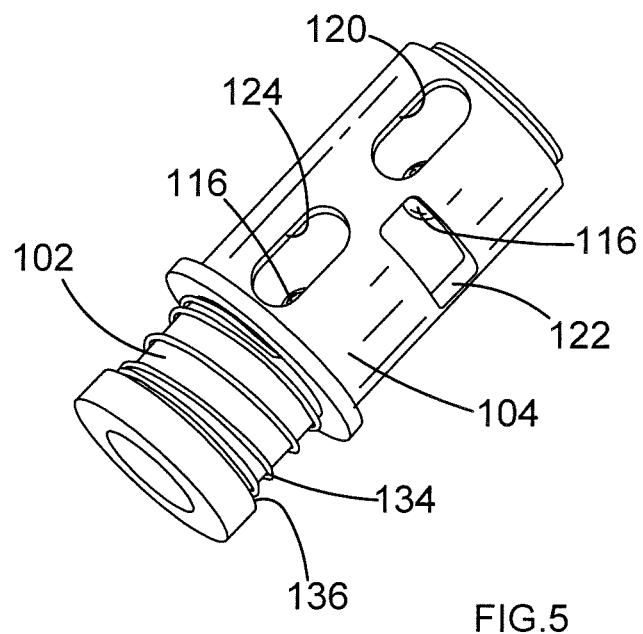
FIG. 5 shows the first inner sleeve mounted on the front end of the spindle together with the biasing spring.

FIG. 5 shows the first inner sleeve 104 mounted on the front end 102. The first inner sleeve 104 can axially slide along the front end 102 and rotate around the front end 102.

The first inner sleeve 104 comprises seven holes 120, 122, 124 formed through the side walls of the first inner sleeve.

The holes 120, 122, 124 are arranged in two sets of three 120, 124 with the seventh 122 located between the two sets 120, 124.

Each set 120, 124 of three comprises three holes located at the same axial position as each other along the sleeve 104 and arranged angularly about the axis of the first inner sleeve 104 at 120 degrees relative to each other in a symmetrical fashion. The holes 120, 124 in each set are angularly aligned with the holes in the other set 120, 124. The shape of the cross section of the six holes 120, 124 is that of an oval with the longer side extending axially along the inner sleeve 104. The width of the holes 120, 124 in the lengthwise direction remains substantially constant and is the same as that of the diameter of the apertures 108, 112 for the positioning ball bearings 116 in the front end 102. The dimensions of each hole 120, 124 in both sets are all the same as each other. The location of the holes 120, 124 on the first inner sleeve 104 correspond to those of the apertures 108, 112 for the positioning ball bearings 116 in the front end 102 of the spindle 102 so that, when the first inner sleeve 104 is in a particular angular position on the front end 102, the holes, 120, 122, 124 and apertures become aligned.

The seventh hole 122 is located axially between the two sets 120, 124 and angularly between two adjacent holes in each set. The shape of the cross section of the seventh hole 122 is that of an oval with the longer side extending circumferentially around the inner sleeve 104. The width of the hole 122 in the lengthwise direction remains substantially constant and is slightly larger than that of the diameter of the seventh aperture 110 in the front end 102.

Figure 6:
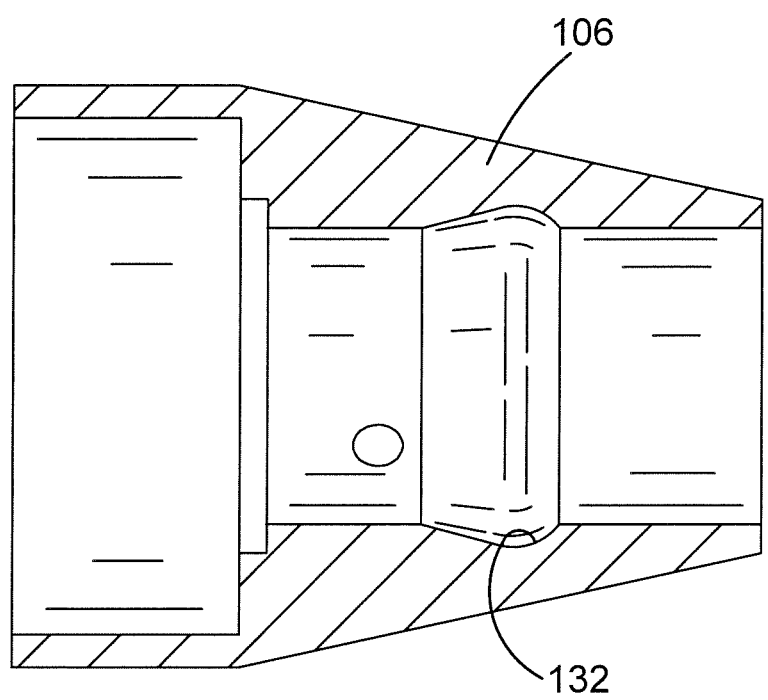
FIG. 6 shows the inside view of the second outer sleeve with the radial groove.
Figure 8A:
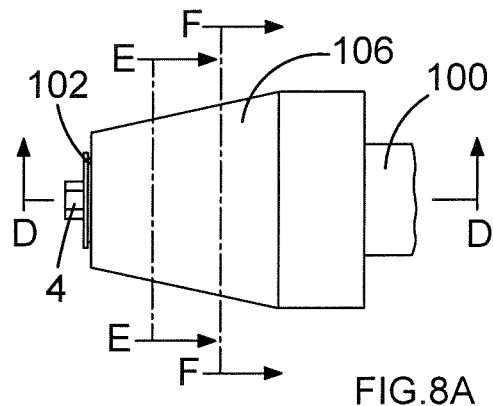
FIG. 8A shows a side view of the tool holder with the first section of a hex shank cutting tool located within the tool holder with the second outer sleeve in the locked position.
Figure 8B:
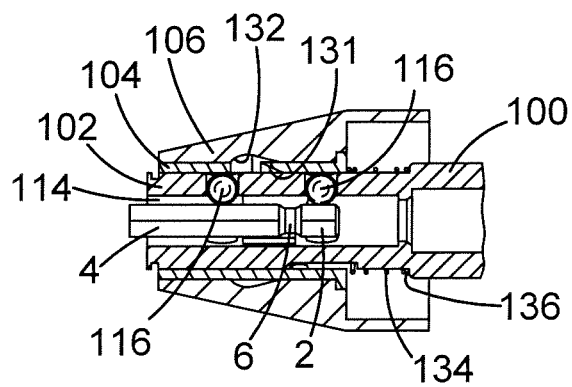
FIG. 8B shows a cross section of tool holder of FIG. 8A in the direction of Arrows D.
Figure 8C:
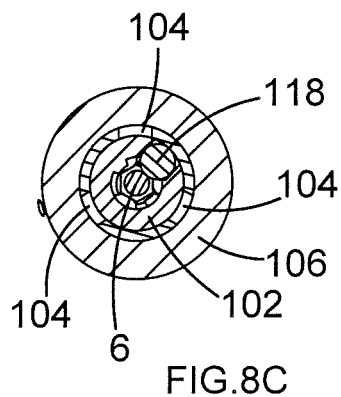
FIG. 8C shows a cross section of tool holder of FIG. 8A in the direction of Arrows E through the front positioning ball bearings.
Figure 8D:
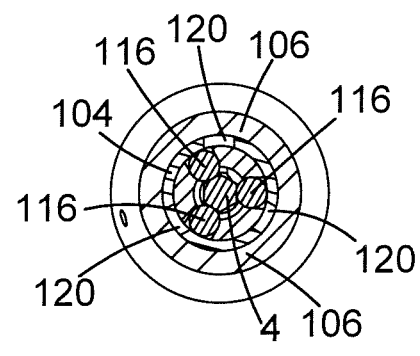
FIG. 8D shows a cross section of tool holder of FIG. 8A in the direction of Arrows F through the locking ball bearing.

The second outer sleeve 106 is rigidly mounted onto the first inner sleeve 104. Formed in the inner wall 130 of the outer sleeve is a radial groove 132 as best seen in FIG. 6. The depth of the groove 132 across the width of the groove in an in axial direction of the outer sleeve 106 increases in the forward direction (as shown in FIG. 8B), the shape of the cross section of the width of the grove 132 remaining constant along the length of the groove 132 around the inner wall of the second outer sleeve 106. When the second outer sleeve 106 is mounted on the first inner sleeve 104, the groove 132 aligns with and faces towards the seventh hole 122 in the inner sleeve. The width of the groove is larger than the width of the seventh hole 122.

A spring 134 is sandwiched between a shoulder 136 on the spindle 100 and the second inner sleeve 104, biasing the inner and outer sleeves 104, 106 in a forward direction.

When the six apertures 108, 112 for the positioning ball bearings 116 and corresponding holes, 120, 122, 124 are in angular alignment due to the angular position of the inner and outer sleeves 104, 106 on the front end 102, the length of the six oval holes 120, 124 for the positioning balls 116 is such that a part of each of the oval holes 120, 124 remains in alignment with the corresponding aperture 108, 112 over the full range of axial sliding movement of the inner and outer sleeves on the front end 102.

The size of the seventh hole 122 aligns with the seventh aperture 110 when the inner and outer sleeves 104, 106 at a rearward axial position on the front end 102. When the seventh aperture 110 and seventh hole 122 are in axial alignment due to the rear axial position of the inner and outer sleeves 104, 106 on the front end 102, the length of the seventh hole 122 is such that a part of the seventh hole 122 remains in alignment with the seventh aperture 110 over the full range of angular movement of the inner and outer sleeves 104, 106 on the front end 102.

The inner and outer sleeves 104, 106 may be rotated to one of two angular positions on the front end 102, a first where the angular position of the inner sleeve 104 and outer sleeve 106 relative to the front end 102 are such that the six holes 120, 124 in the inner sleeve 104 are aligned with the six apertures 108, 112 for the positioning ball bearings 116 and a second where the six holes 120, 124 in the inner sleeve 104 are offset relative to the apertures 108, 112 for the positioning ball bearings 116. When the six holes 120, 124 are aligned with the six apertures 108, 112, when the sleeves 104, 106 are in their first position, a part of the sides of the positioning ball bearings 116, 118 can either project from the apertures 108, 112 into the tubular passage 114 or project radially outwardly from the apertures 108, 112 in the front end 102 and into the corresponding holes 120, 124. When the six oval holes 120, 124 are offset relative the apertures 108, 112 for the positioning ball bearings 116, when the sleeves 104, 106 are in their second position, a part of the sides of the positioning ball bearings 116, 118 project from the apertures 108, 112 into the tubular passage 114 as they are prevented from projecting radially outwardly from the apertures 108, 112 in the front end 102 by the inner wall of the inner sleeve 104, the inner wall of the inner sleeve 104 holding the positioning ball bearings 116 in this inner position.

When the tool holder is unused prior to the insertion of a cutting tool, the inner and outer sleeves 104, 106 are biased forwards by the spring 134 to a maximum forward position on the front end 102. When the sleeves 104, 106 are in their first position with the holes 120, 122, 124 aligned with the apertures 108, 110, 112, it is the rear parts of the oval holes 120, 124 that are in alignment with the apertures 108, 112 for the positioning ball bearings 116 as the sleeves 104, 106 are biased forwards by the spring 134 when the tool holder is unused.

The inner and outer sleeves 102 may also be axially slid between one of two axial positions on the front end 102, a first rearward axial position of the inner sleeve 104 and outer sleeve 106 relative to the front end 102 where the seventh hole 122 in the inner sleeve 104 is aligned with the seventh aperture 110 of the front end 102 and a second forward position where the seventh hole 122 in the inner sleeve 104 is offset relative to the seventh aperture 110 of the front end 102. When all the seventh hole 122 is aligned with the seventh aperture 110, when the sleeves 104, 106 are in their first rearward axial position, a part of the side of the locking ball bearing 118 can either project from the aperture 110 into the tubular passage 114 or project radially outwardly from the aperture 110 in the front end 102 and into the seventh hole 122 and groove 132. When the seventh hole 122 is offset relative the seventh aperture 112, when the sleeves 104, 106 are in their second forward position, a part of the side of the locking ball bearing 118 projects from the seventh aperture 110 into the tubular passage 114 as it is prevented from projecting radially outwardly from the aperture 110 in the front end 102 by the inner wall of the inner sleeve 104, the inner wall of the inner sleeve 104 holding the locking ball bearing 118 in this inner position.

The present embodiment of tool holder can be used to hold cutting tools with two different design of first section, namely a cutting tool with a hex shank and a cutting tool with a SDS plus shank.

The use of the first embodiment of the tool holder with a hex shank cutting tool will now be described with reference to FIGS. 7 and 8.

In order for the tool holder to be used with a hex shank, the positioning ball bearings 116 must be in their inner position. When the positioning ball bearings 116 are in their inner position, they provide support to the sides of the shank of the hex shank. If the positioning ball bearings 116 are in an out outer position, they would not provide any support to the sides of the hex shank, allowing too much movement of the cutting tool in a direction perpendicular to its longitudinal axis.

Figure 7A:
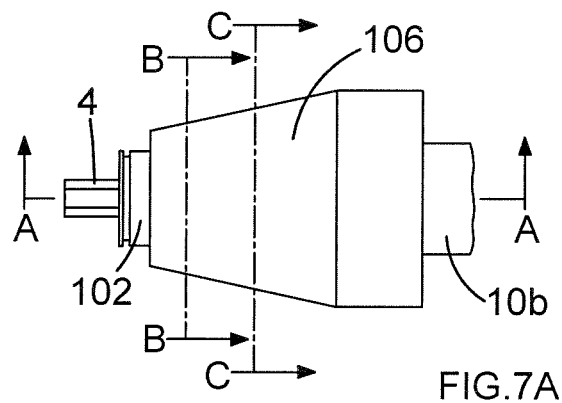
FIG. 7A shows a side view of the tool holder with the first section of a hex shank cutting tool being inserted into the tool holder with the second outer sleeve in the released position.
Figure 7B:
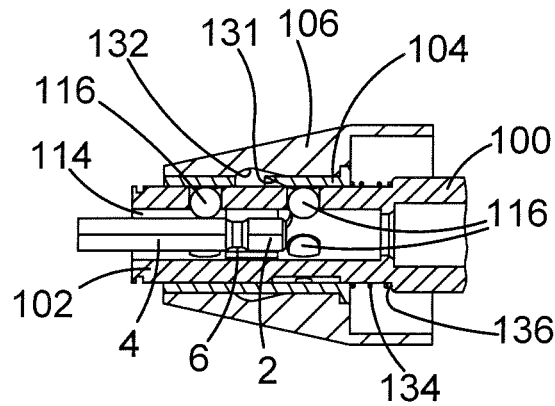
FIG. 7B shows a cross section of tool holder of FIG. 7A in the direction of Arrows A.
Figure 7C:
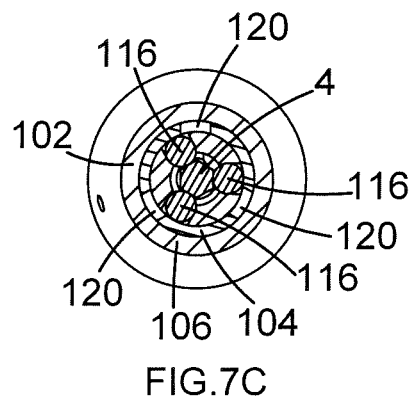
FIG. 7C shows a cross section of tool holder of FIG. 7A in the direction of Arrows B through the front positioning ball bearings.
Figure 7D:
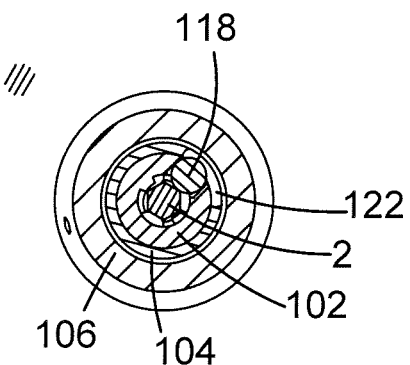
FIG. 7D shows a cross section of tool holder of FIG. 7A in the direction of Arrows C through the locking ball bearing.

Firstly, the inner and out sleeves 104, 106 are rotated on the front end 102 so that they in their second angular position with the six holes 120, 124 of the inner sleeve 104 are offset to the corresponding apertures 108, 112 of the front end 102. This results in the positioning ball bearings 116 being moved to their inward position inside of the inner sleeve 104 as best seen in FIGS. 7B and 7C. The side walls of the apertures 108, 112 may be angled slightly to encourage the movement of the positioning ball bearings 116 to their inner position. In this position, a part of the sides of each of the positioning ball bearings 116 projects from the apertures 108, 112 into the tubular passage 114 and are held in this inner position. The dimensions of the tool holder are such that when the positioning ball bearings 116 are in this position, they correspond to the outer dimensions of the centre of the flat sides 140 of the hex shank.

Secondly the inner and outer sleeves 104, 106 are slid rearwardly on the front end 102 against the biasing force of the spring 134 so that the seventh hole 122 and groove 132 align with the seventh aperture 110. This allows the locking ball bearing 118 to move outwardly, with part of the locking ball bearing 118 entering the seventh hole 122 and groove 132.

The first section 20 of the hex shank is then inserted into the tool holder (as shown in FIGS. 7A to 7D). The positioning ball bearings 116 engage with the centre of the flat sides 140 of the hex shank and guide the movement of the first section 20 inside the tubular passage 114, preventing movement of the hex shank in a direction perpendicular to the longitudinal axis of the hex shank. The hex shank is inserted to a depth where the groove 6 of the first section is aligned with the locking ball bearing 118. The inner and outer sleeves are then released, allowing the spring 134 to move the sleeves 104, 106 in a forward direction. As the sleeves 104, 106, move in a forward direction, the groove 132 and seventh hole 122 move forward of the seventh aperture 110, causing the locking ball bearing 118 to move to its inner position where it is held by the inner wall of the inner sleeve 104. The shape of the groove 132 in the outer sleeve encourages the movement of the locking ball bearing into its inner position. The side walls of the seventh aperture 110 may be angled slightly to encourage the movement of the locking ball bearing 116 to its inner position. In its inner position (as shown in FIGS. 8A to 8D), part of the locking ball bearing 118 extends into the tubular passageway 114 and into the groove 6 of the first section 20 of the hex shank. The hex shank is axially locked into the tool holder by locking ball 118 being held in the groove 6 of the first section 20 of the hex shank.

The positioning ball bearings 116 located against the centre of the flat sides 140 of the two sub sections 2, 4. As the positioning ball bearings 116 are held in this position by the inner sleeve, they are prevented from moving outwardly and therefore cannot pass over the axial ridges formed between adjacent flat faces 140 of the hex shank. Therefore, each positioning ball bearing is locked against the flat side 140 it is engaged with in a circumferential direction. As such, when the tool holder is rotated, the rotary movement of the tool holder is transferred to the hex shank via the positioning ball bearings 116 which are locked against the face of the flat sides 140.

The first section of the hex shank is released from the tool holder by the inner and outer sleeves 104, 106 being slid rearwardly against the biasing force of the spring 134 to align the groove 132, the seventh hole 122 and the aperture 110. This allows part of the locking ball bearing 118 to move outwardly from the seventh aperture into the seventh hole 122 and groove 132. As such, the part of locking ball bearing 118 in the tubular passage 114 moves out of the tubular passage 114, disengaging from the groove 6 of the first section 20 of the hex shank, allowing it to be withdrawn from the tool holder.

The use of the first embodiment of the tool holder with a SDS plus shank cutting tool will now be described with reference to FIGS. 9 and 10.

In order for the tool holder to be used with a SDS plus shank, the positioning ball bearings 116 must be in their outer position. When the positioning ball bearings 116 are in their outer position, they provide support to the sides of the shank of the SDS plus shank. If the positioning ball bearings 116 are in their inner position, the first section of the SDS plus shank would be prevented from entering the tubular passage 114 of the tool holder.

Figure 9A:
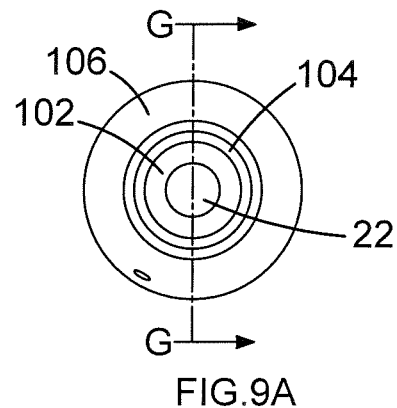
FIG. 9A shows a front view of the tool holder with the first section of a SDS plus shank cutting tool being inserted within the tool holder with the second outer sleeve in the released position.
Figure 9B:
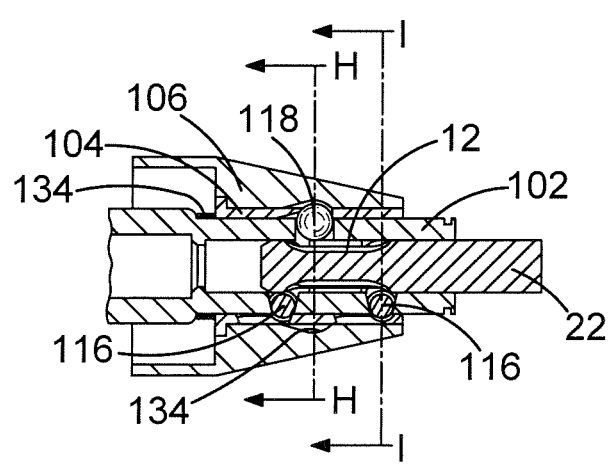
FIG. 9B shows a cross section of tool holder of FIG. 9A in the direction of Arrows G.
Figure 9C:
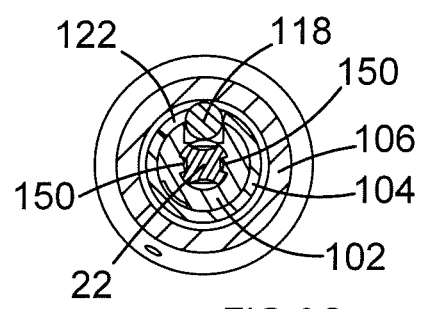
FIG. 9C shows a cross section of tool holder of FIG. 9B in the direction of Arrows H through the locking ball bearing.
Figure 9D:
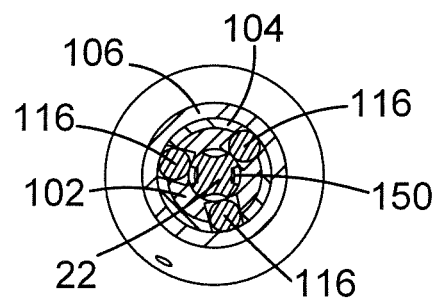
FIG. 9D shows a cross section of tool holder of FIG. 9B in the direction of Arrows I through the front positioning ball bearings.
Figure 10A:
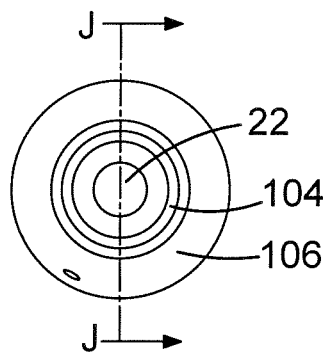
FIG. 10A shows a front view of the tool holder with the first section of a SDS plus shank cutting tool located within the tool holder with the second outer sleeve in the locked position.
Figure 10B:
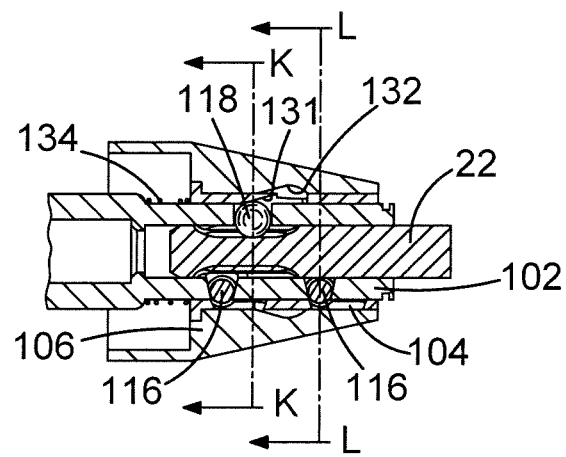
FIG. 10B shows a cross section of tool holder of FIG. 10A in the direction of Arrows J.
Figure 10C:
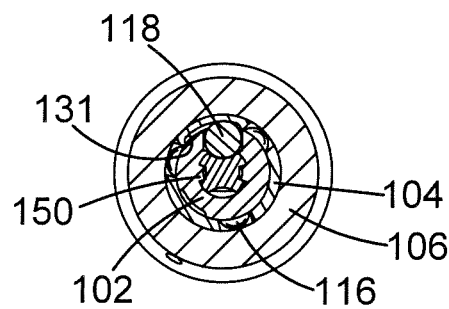
FIG. 10C shows a cross section of tool holder of FIG. 10B in the direction of Arrows K through the locking ball bearing.
Figure 10D:
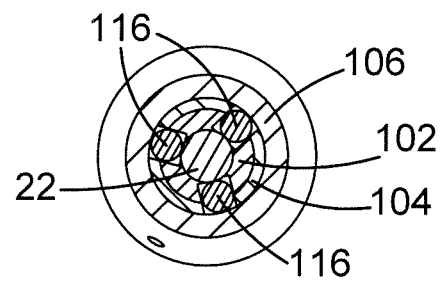
FIG. 10D shows a cross section of tool holder of FIG. 10B in the direction of Arrows L through the front positioning ball bearings.
Figure 11:
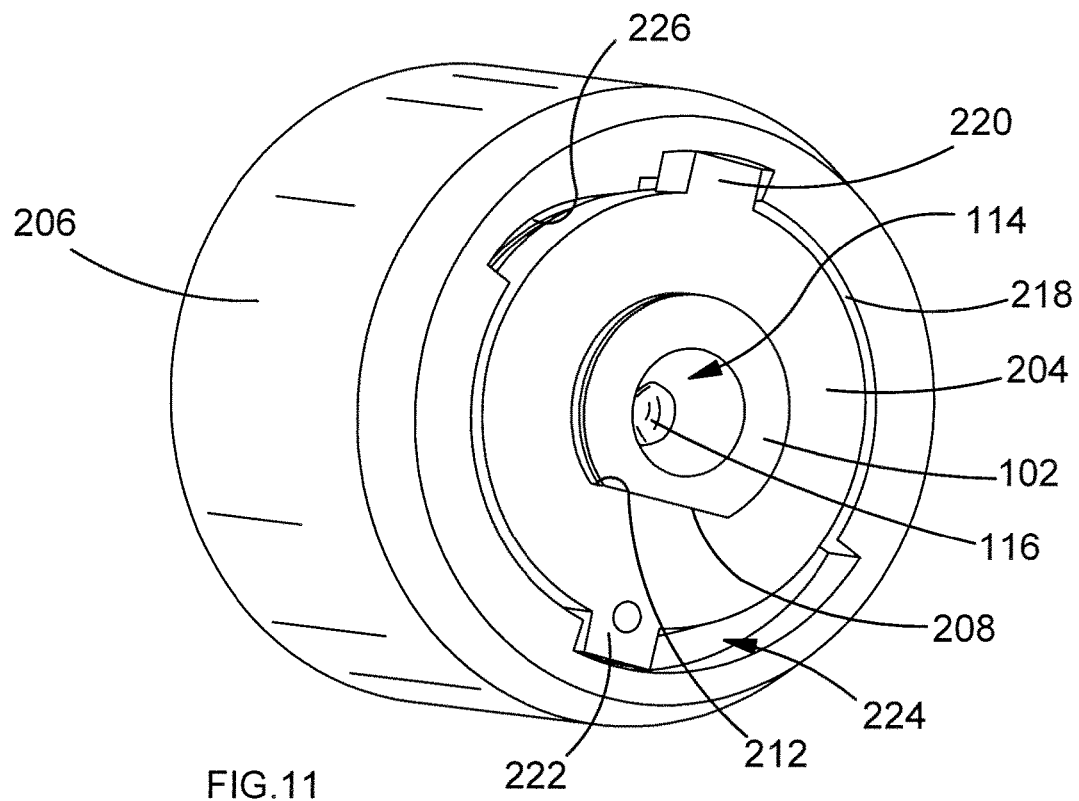
FIG. 11 shows a side view of the second embodiment of the tool holder.

Firstly, the inner and out sleeves are rotated on the front end 102 so that they in their first angular position with the six holes 120, 124 of the inner sleeve 104 are aligned with the corresponding apertures of the front end 102. This results in the positioning ball bearings 116 being able to move to their outer position inside of the apertures 108, 112 in the inner sleeve 104 as best seen in FIG. 9D. In this position, a part of the sides of each of the positioning ball bearings 116 are able to project outwardly from the apertures 108, 112 into the holes 120, 124 of the inner sleeve 104. The dimensions of the tool holder are such that when the positioning ball bearings 116 located in their outer position, they correspond to the outer dimensions of the first section of the SDS plus shank Secondly the inner and outer sleeves 104, 106 are slid rearwardly on the front end 102 against the biasing force of the spring 134 so that the seventh hole 122 and groove 132 align with the seventh aperture 110. This allows the locking ball bearing to move outwardly, with part of the locking ball bearing 118 entering the seventh hole 122 and groove 132.

The first section 22 of the SDS plus shank is then inserted into the tool holder (as shown in FIGS. 9A to 9D). The positioning ball bearings 116 engage with the end of the first section 22 of the SDS plus shank and move them to their outer most position. Subsequently, the positioning ball bearings 116 engage with the sides of the first section 22 of the SDS plus shank and guide the movement of the first section 22 inside the tubular passage 114, preventing movement of the SDS plus shank in a direction perpendicular to the longitudinal axis of the SDS plus shank. The SDS plus shank is inserted to a depth where one of the elongate axial recesses 12 of the first section 22 is aligned with the locking ball bearing 118. The inner and outer sleeves 104, 106 are then released, allowing the spring 134 to move the sleeves 104, 106 in a forward direction. As the sleeves 104, 106, move in a forward direction, the groove 132 and seventh hole 122 move forward of the seventh aperture 110, causing the ball bearing to move to its inner position where it is held by the tapered rear wall 131 inner wall of the inner sleeve 104 (as shown in FIGS. 10A to 10D). The shape of the groove 132 in the outer sleeve 106 and the tapered rear side wall 131 encourages the movement of the locking ball bearing 118 into its inner position. In its inner position, part of the locking ball bearing 118 extends into the tubular passageway 114 and into the elongate axial recess 12 of the first section 22 of the SDS plus shank. The SDS plus shank is axially locked into the tool holder by locking ball 118 being held in the axial recess 12 of the first section 22 of the SDS plus shank. The SDS plus shank can axially slide over a limited range of movement due to the locking ball bearing 118 sliding along the axial recess 12.

Formed insides of the tubular passage 114, along the length of the passage 114, are two ribs 150 which are located opposite each other within the tubular passage 114. The ribs 150 engage with the grooves 10 in the first section 22. Rotary movement of the tool holder is transferred to the first section 22 of the SDS plus shank via the ribs 150 engagement with the grooves 10. The height of the ribs 150 is such that they do not interfere with the insertion of a hex shank into the tubular passageway 114 of the tool holder.

The first section of the SDS plus shank is released from the tool holder by the inner and outer sleeves 104, 106 being slid rearwardly against the biasing force of the spring 134 to align the groove 132, the seventh hole 122 and the aperture 110. This allows part of the locking ball bearing 118 to move outwardly from the seventh aperture into the seventh hole 122 and groove 132. As such, the part of locking ball bearing 118 in the tubular passage 114 can move out of the tubular passage 114, disengaging from the axial recess 12 of the first section 22 of the SDS plus shank, allowing it to be withdrawn from the tool holder.

The second embodiment of the tool holder will now be described with reference to FIGS. 11 to 21.

The second embodiment of the tool holder comprises the front end 102 of the spindle, two positioning sleeves 200, a locking sleeve 202, an end plate 204, and an outer twisting sleeve 206. Where the same features in the second embodiment were present in the first, the same reference numbers have been used.

Figure 12:
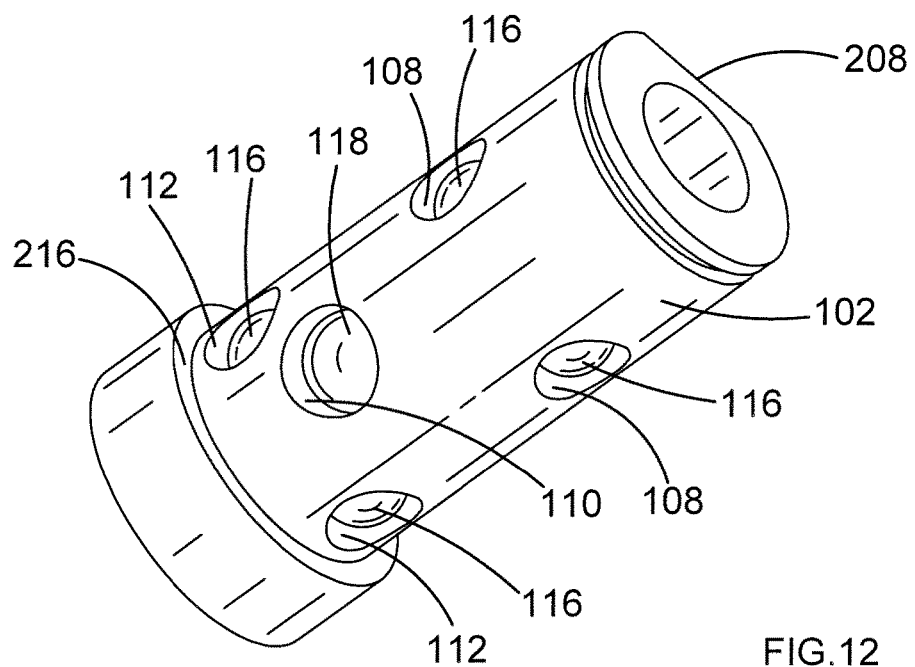
FIG. 12 shows the front end of the spindle of a hammer drill with the positioning ball bearings and locking ball bearing in their respective apertures.

FIG. 12 shows the tubular front end 102 of the spindle 100 without the sleeves 200, 202, 206 and end plate 204 which is formed by a wall of uniform thickness except along one side at the front where a flat surface 208 has been formed. The front end 102 comprises seven circular apertures 108, 110, 112 formed through the sides walls of the front end 102 away from the flat surface 208. The apertures 108, 110, 112 are arranged in two sets of three 108, 112 with the seventh 110 located between the two sets 108, 112. Each set 108, 112 of three comprises three apertures located at the same axial position as each other along the front end 102 and arranged angularly about the longitudinal axis of the front end 102 at 120 degrees relative to each other in a symmetrical fashion. The apertures 108, 112 in each set are angularly aligned with the apertures in the other set 108, 110. The diameter of each aperture 108, 112 in both sets are all the same as each other. The seventh aperture 110 is located axially between the two sets 108, 112 and angularly between two adjacent apertures in each set. The diameter of the seventh aperture is slightly larger than that of the six apertures in the two sets 108, 112.

Six positioning ball bearings 116 are located within the two sets 108, 112 of three apertures, each having the same diameter. The diameter of the cross section of each of the six apertures 108, 112 is slightly reduced at the entrance to the six apertures 108, 112 formed in the inner wall of the front end 102 where the apertures 108, 112 meet the tubular passage 114 to prevent the positioning ball bearings 116 from exiting the apertures 108, 112 and entering the tubular passage 114 whilst allowing part of the sides of positioning ball bearings 116 to project into the tubular passage 114 from the apertures. The diameter of the support ball bearings 116 is greater than the thickness of the wall of the front end 102 and therefore a part of the sides of the positioning ball bearings 116 either project into the tubular passage 114 or project radially outwardly from the front end 102.

A seventh locking ball bearing 118 is located within the seventh aperture 110. The diameter of the seventh ball bearing 118 is larger than that of the six positioning ball bearings 116. The diameter of the cross section of each of the seventh aperture 110 is slightly reduced at the entrance to the seventh aperture 110 formed in the inner wall of the front end 102 where the aperture 110 meets the tubular passage 114 to prevent the ball bearing 118 from exiting the aperture 110 and entering the tubular passage 114 whilst allowing part of the side of the locking ball bearing 118 to project into the tubular passage 114 from the aperture 110. The diameter of the ball bearing 118 is greater than the thickness of the front end 102 and therefore a part of the side of the ball bearing 118 either projects into the tubular passage 114 or projects radially outwardly from the front end 102.

Figure 13:
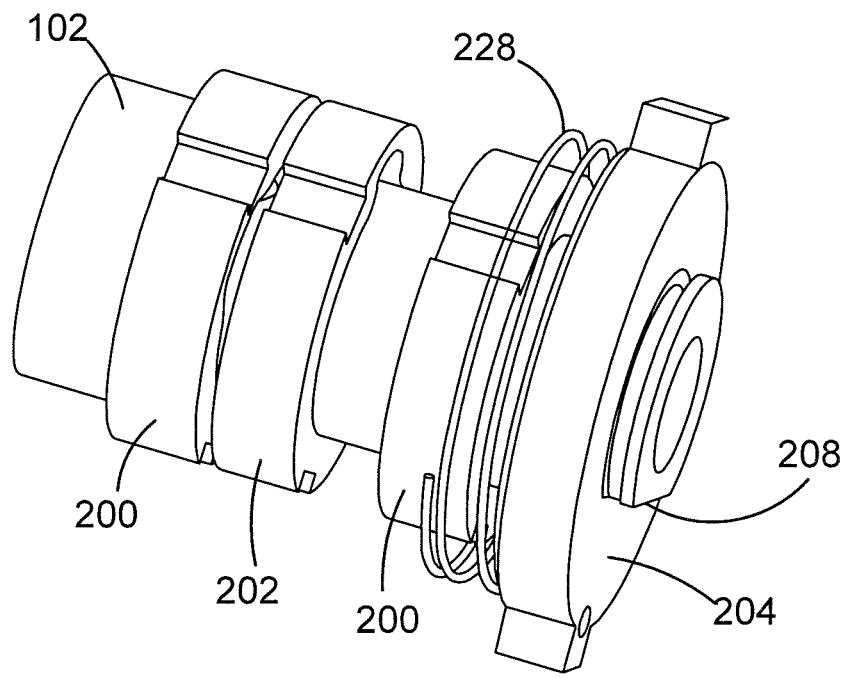
FIG. 13 shows the two positioning sleeves, the locking sleeve, and the end plate mounted on the front end of the spindle together with a biasing spring.
Figure 15:
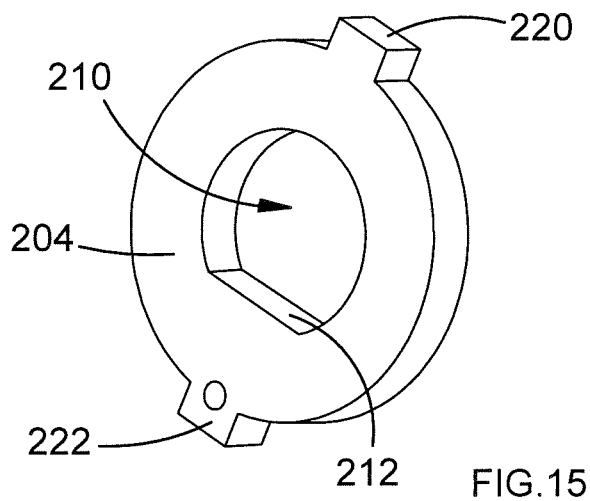
FIG. 15 shows a perspective view of the end plate.

As best seen in FIG. 13, two positioning sleeves 200 are rotationally mounted on the front end 102, each of which surrounds one set of the positioning ball bearings 116. One locking sleeve 204 is mounted between the two positioning sleeves 200 and surrounds the locking ball bearing 118. The end plate 204 is mounted on the end of the front end 102. The end plate 204 (as shown in FIG. 15) comprises an aperture 210 which has a corresponding cross section in shape to that of the end of the front end 102, the end being inserted into the aperture 210. The aperture 210 comprises a corresponding flat surface 212 which engages with the flat surface 208 of the front end 102. This prevents the end plate 204 from rotating around the front end 102 making it rotationally fixed to the front end 102.

Figure 14:
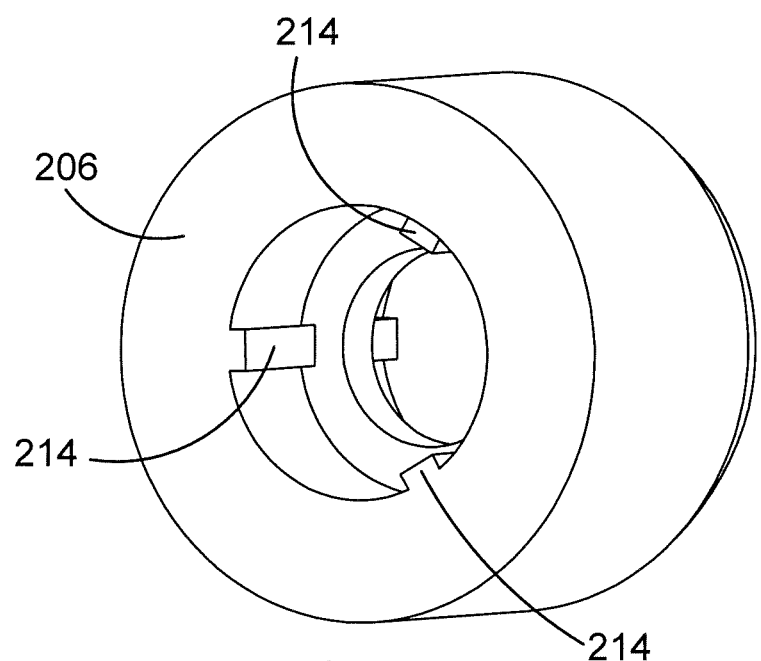
FIG. 14 shows the inside view of the twisting sleeve.
Figure 16:
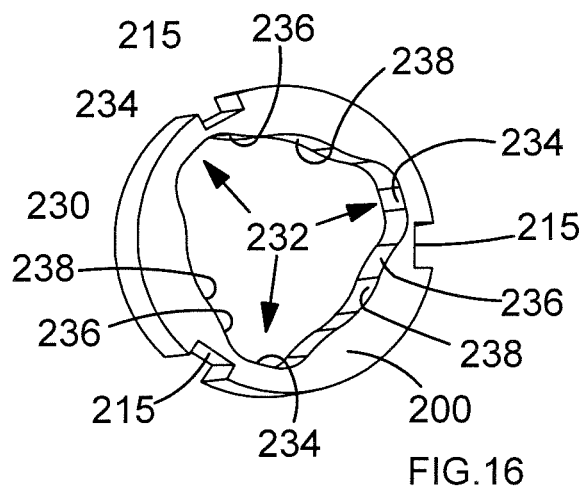
FIG. 16 shows a perspective view of the positioning sleeve.
Figure 17:
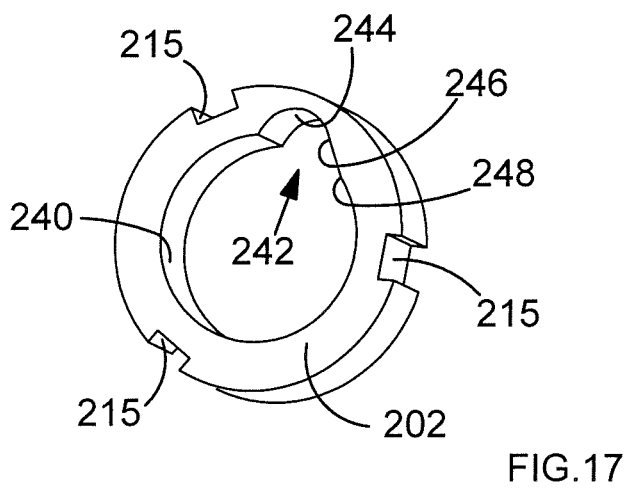
FIG. 17 shows a perspective view of the locking sleeve.
Figure 18A:
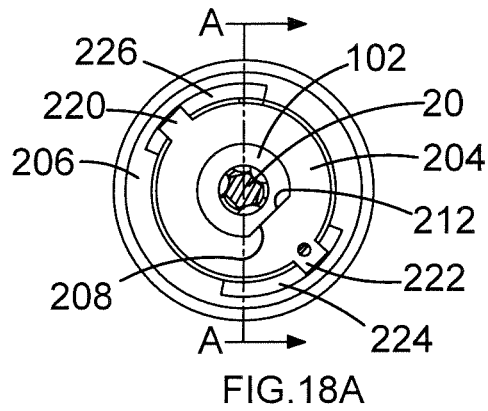
FIG. 18A shows a front view of the tool holder with the first section of a hex shank cutting tool being inserted into the tool holder with the twisting sleeve in the released position.
Figure 18B:
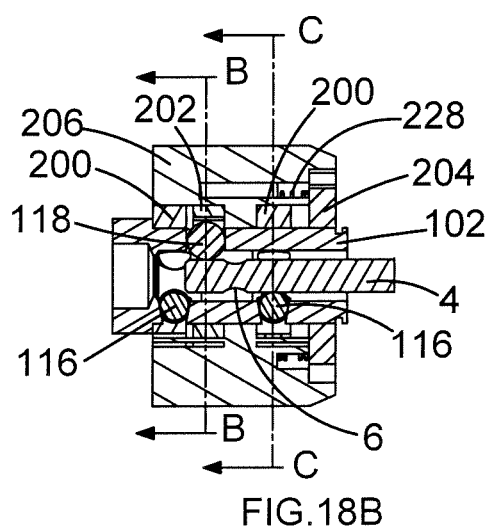
FIG. 18B shows a cross section of tool holder of FIG. 18A in the direction of Arrows A.
Figure 18C:
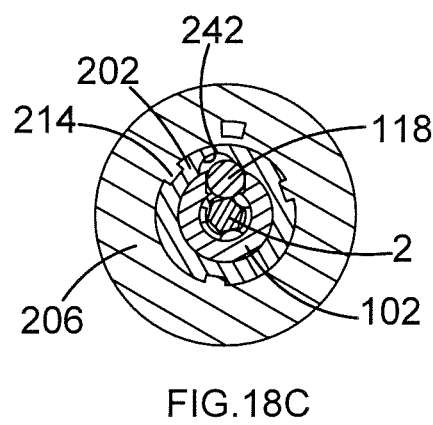
FIG. 18C shows a cross section of tool holder of FIG. 18B in the direction of Arrows B through the locking ball bearing.
Figure 18D:
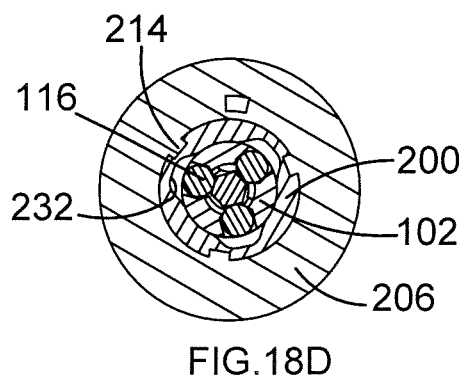
FIG. 18D shows a cross section of tool holder of FIG. 18B the direction of Arrows C through the front positioning ball bearings.
Figure 19A:
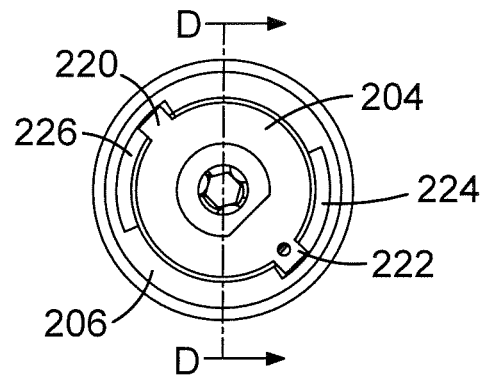
FIG. 19A shows a front view of the tool holder with the first section of a hex shank cutting tool located within the tool holder with the twisting sleeve in the locked position.
Figure 19B:
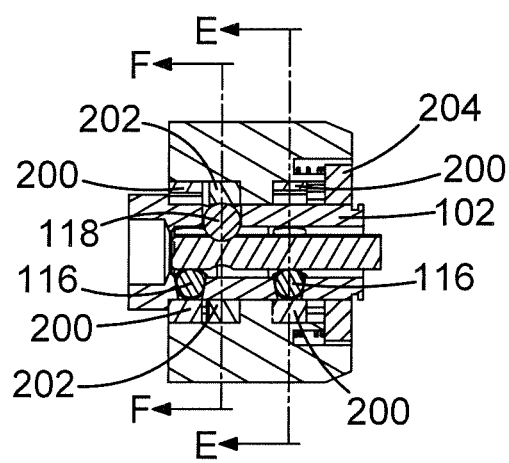
FIG. 19B shows a cross section of tool holder of FIG. 19A in the direction of Arrows D.
Figure 19C:
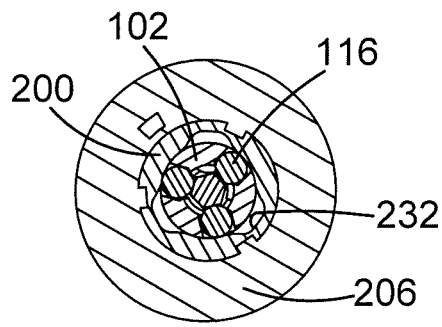
FIG. 19C shows a cross section of tool holder of FIG. 19B in the direction of Arrows E through the front positioning ball bearings.
Figure 19D:
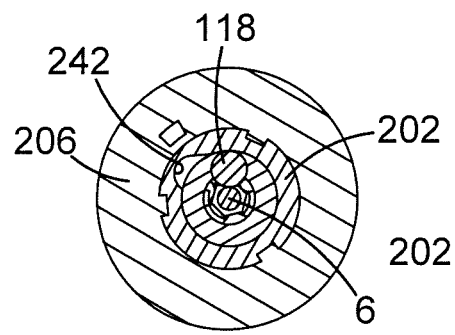
FIG. 19D shows a cross section of tool holder of FIG. 19B in the direction of Arrows F through the locking ball bearing.
Figure 20A:
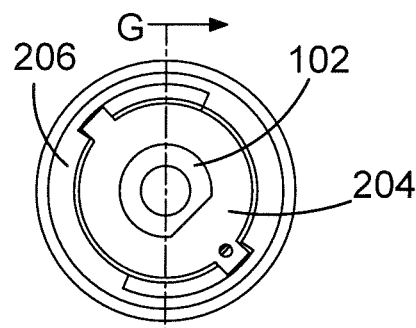
FIG. 20A shows a front view of the tool holder with the first section of a SDS plus shank cutting tool being inserted within the tool holder with the twisting sleeve in the released position.
Figure 20A:
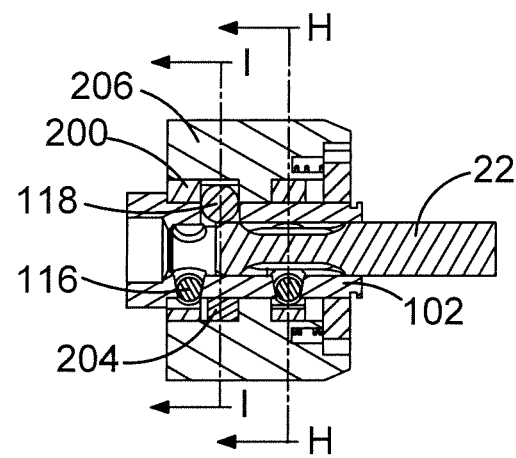
Figure 20C:
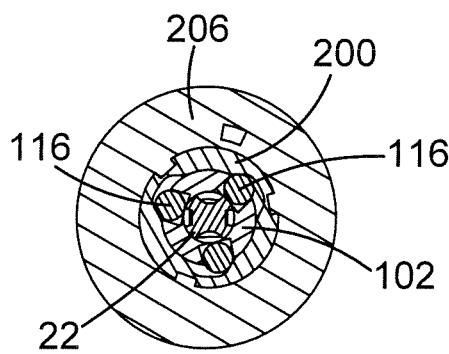
FIG. 20C shows a cross section of tool holder of FIG. 20B in the direction of Arrows H through the front positioning ball bearings.
Figure 20D:
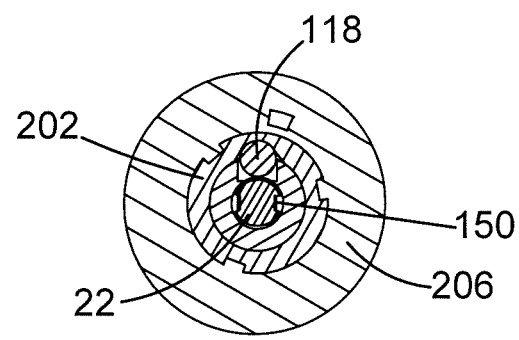
FIG. 20D shows a cross section of tool holder of FIG. 20B in the direction of Arrows I through the locking ball bearing.
Figure 21A:
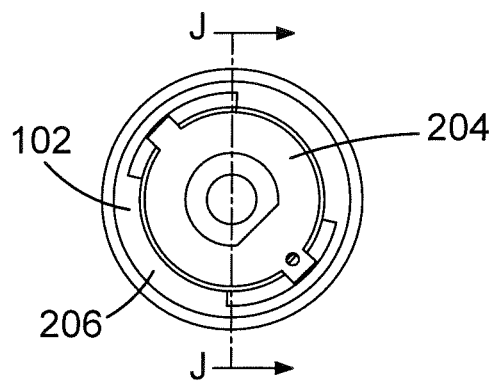
FIG. 21A shows a front view of the tool holder with the first section of a SDS plus shank cutting tool located within the tool holder with the twisting sleeve in the locked position.
Figure 21B:
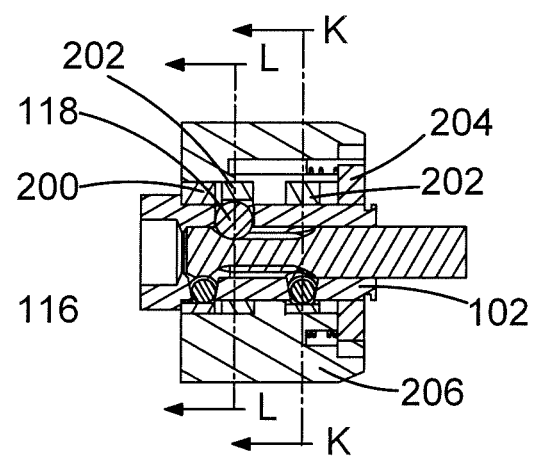
FIG. 21B shows a cross section of tool holder of FIG. 21A in the direction of Arrows J.
Figure 21C:
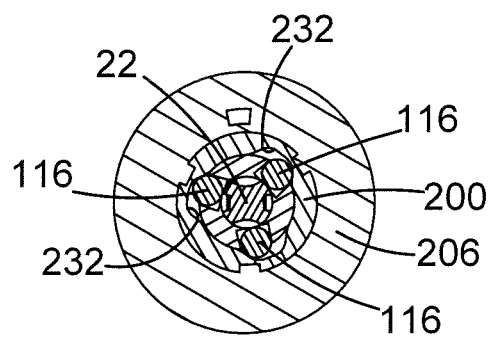
FIG. 21C shows a cross section of tool holder of FIG. 21B in the direction of Arrows K through the front positioning ball bearings.
Figure 21D:
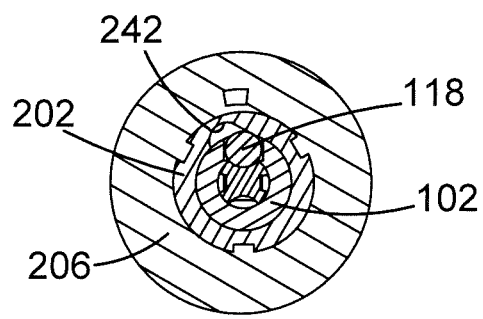
FIG. 21D shows a cross section of tool holder of FIG. 21B in the direction of Arrows L through the locking ball bearing.
Figure 22:
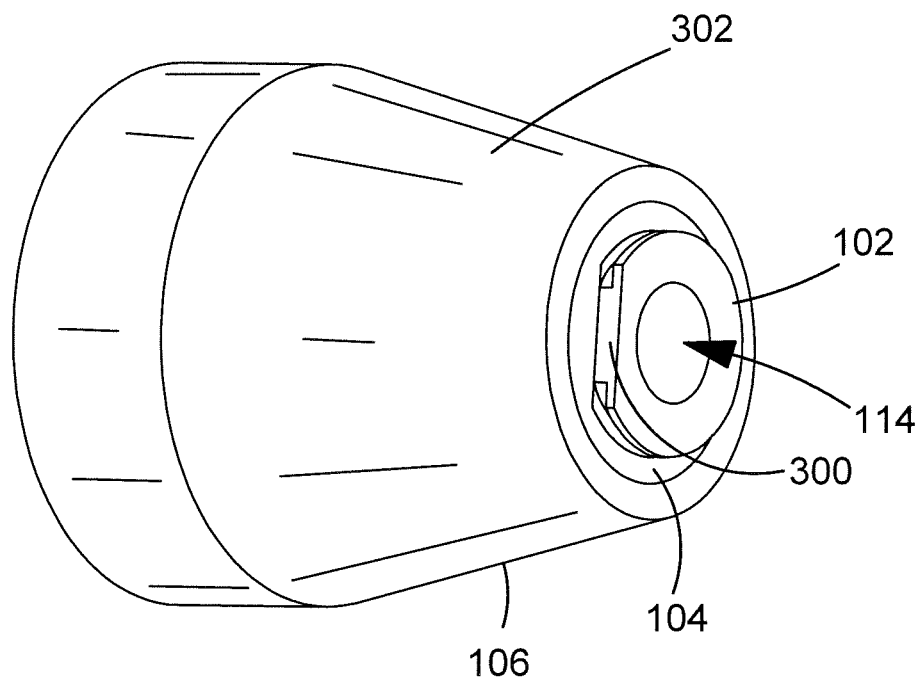
FIG. 22 shows a side view of the third embodiment of the tool holder.

The outer twisting sleeve 206 (as shown in FIG. 14) is mounted on and rigidly attached to the two positioning sleeves 200 and the locking sleeve 202 by axial ribs 214 formed on the inside of the twisting sleeved 206 locating in and engaging with axial slots 215 formed on the outer periphery to the two positioning sleeves 200 (as shown in FIG. 16) and the locking sleeve 202 (as shown in FIG. 17). Rotation of the twisting sleeve 206 results in rotation of the two positioning sleeves 200 and the locking sleeve 202 by the same amount. The twisting sleeve 206 is prevented from sliding rearwardly by abutting against a shoulder 216 formed on the front end 102 of the spindle 100. The twisting sleeve 206 is prevented from sliding forward by the end plate 204. As such the twisting sleeve 206 is prevented from moving axially on the front end 102, which in turn prevents any axial movement of the two positioning sleeves 200 and the locking sleeve 202 on the front end 102.

A recess 218 is formed in the front end of the twisting sleeve 206 in which the end plate 204 is located. The end plate comprises two arms 220, 222 which project radially outwards in opposite directions. The edge of the recess 218 comprises two pockets 224, 226 into each of which projects an arm 220, 222. When the twisting sleeve 206 is rotated about front end 102 and the end plate 204, the arms 220, 222 slide along the pockets 224, 226 until they engage with the ends of the pockets 224, 226 where they are prevented from any further rotational movement. The arms 220, 222 and pockets 224, 226 limit the amount of angular movement of the twisting sleeve 206 on the front end 102. A spring 228 is attached between the end plate 204 and the twisting sleeve 206 and angularly biases it towards a first angular end position where the arms 220, 222 are located at one end of the pockets 224, 226.

FIG. 16 shows the positioning sleeve 200. Formed symmetrically around the internal wall 230 are three identical cam surfaces 232, each of which has three locating positions 234, 236, 238. When the positioning sleeve 200 is mounted on the front end 12, one positioning ball bearing 116 locates against each cam surface 232, the positioning ball bearing 116 engaging with the cam surface at different positions along the cam surface depending on the angular position of the positioning sleeve 200 on the front end 102. When each ball bearings 116 is located at the three locating positions 234, 236, 238, the positioning ball bearings 116 are located in a different radial positions. The spring 228 urges the twisting sleeve towards its first end position which is where the cam surfaces urges the positioning ball bearings 116 to their inner most position.

FIG. 17 shows the locking sleeve 202. Formed on the internal wall 240 is a cam surface 242 which has three locating positions 244, 246, 248. When the locking sleeve 200 is mounted on the front end 12, the locking ball bearing 118 locates against the cam surface 242, the locking ball bearing 118 engaging with the cam surface at different positions along the cam surface depending on the angular position of the locking sleeve 202 on the front end. When the locking ball bearing 118 is located at the three locating positions, the locking ball bearing 118 is located in a different radial position. The spring 228 urges the twisting sleeve towards its first end position which is where the cam surface 242 urges the locking ball bearing 118 to its inner most position.

In order to insert a cutting tool into the tool holder, the twisting sleeve 206 is rotated against biasing force of the spring 228 so that each of the arms 220, 222 of the end plate 204 move from one end of the pocket 224, 226 to a second end position at the other end of the pocket 224, 226. When it is in this position, the cams 232 which are in engagement with the positioning ball bearings 116 moving over the position ball bearings 116 (which are rotationally fixed relative the front end 102 due to being located within the apertures 108, 112) until the ball bearings 116 are capable of locating in a first locating position 234 on the cam 232. The first locating position 234 is the position where the ball bearings 116 can locate in their most radially outward position. Similarly, when the twisting sleeve 106 is in the second end position, the cam 242 which is in engagement with the locking ball bearing 118 moves over the locking ball bearing 116 (which is rotationally fixed relative the front end 102 due to be located within the seventh aperture 110) until the ball bearing 118 is capable of locating in a first locating position 244 on the cam 242. The first locating position 244 is the position where the locking ball bearing 118 can locate in the most radially outward position. When the positioning ball bearings 116 and locking ball bearing 118 are in these positions, first section of either a hex shank cutting tool or a SDS plus cutting tool can be inserted into the tubular passageway 114.

The insertion of a first section of the hex shank cutting tool will now be described with reference to FIGS. 18 and 19.

When the twisting sleeve 206 is twisted to its second end position, the first section 20 of the hex shank is inserted into the tubular passage 114 (as shown in FIGS. 18A to 18D). As the cams 232, 242 for the positioning ball bearings 116 and the locking ball bearing 118 are located with their first locating position 234, 244 facing the ball bearings 116, 118, the ball bearings 116, 118 can move to their outer most position allowing the first section 20 to pass by. The twisting force applied to twisting sleeve 206 is then removed, allowing the twisting sleeve 206 to rotate due to the biasing force of the spring 228. The rotation of the twisting sleeve 206 causes the positioning sleeves 200 and locking sleeve 202 to rotate such that the third locating positions 238, 248 face and engage with the ball bearings 116, 118. When the third locating positions 238, 248 are engagement with the ball bearings 116, 1118, the ball bearings 116, 118 are urged to the inner most position. In this position, the positioning ball bearings 116 engage with the flat surfaces 140 of sides of the first section 20 and the locking ball bearing 118 engages with the groove 6 (as shown in FIGS. 19A to 19D). The positioning ball bearings 116 prevent movement of the first section 20 in a direction perpendicular to the longitudinal axis of the cutting tool. The locking ball bearing 118 axially locks the first section 20 within the tubular passage 114. Rotational movement of the tool holder is transferred to the first section 20 via the positioning ball bearings 116 and their engagement with the flat surfaces 140 of the first section 20.

In order to release the first section 20 of the hex shank from the tool holder, the twisting sleeve 206 is rotated against the biasing force of the spring 228 until it is located in its first end position. When the twisting sleeve 206 is in this position, the cams 232, 242 for the positioning ball bearings 116 and the locking ball bearing 118 are located with their first locating position, 234, 244 facing the ball bearings 116, 118. This allows the ball bearings 116, 118 to move to their outer most position allowing the first section 20 to pass by and be removed from the tool holder.

The insertion of a first section of the SDS plus shank cutting tool will now be described.

When the twisting sleeve 206 is twisted to its second end position, the first section 22 of the SDS shank is inserted into the tubular passage 114. As the cams 232, 242 for the positioning ball bearings 116 and the locking ball bearing 118 are located with their first locating position 234, 244 facing the ball bearings 116, 118 the ball bearings 116, 118 can move to their outer most position allowing the first section 22 to pass by. The twisting force applied to twisting sleeve 206 is then removed, allowing the twisting sleeve 206 to rotate due to the biasing force of the spring 228. The rotation of the twisting sleeve 206 causes the positioning sleeves 200 and locking sleeve 202 to rotate such that a second intermediate locating position 236, 246 of the cams 232, 242 face and engage with the ball bearings 116, 118. When the second locating positions 236, 246 are in engagement with the ball bearings 116, 118, the positioning ball bearings 116 are urged into engagement with the sides of the first section 22 and the locking ball bearing 118 engages with an axial recess 12. The positioning ball bearings 116 prevent movement of the first section 22 in a direction perpendicular to the longitudinal axis of the cutting tool. The locking ball bearing 118 axially locks the first section 22 within the tubular passage 114. Rotational movement of the tool holder is transferred to the first section 22 via ribs 150 formed inside of the tubular passage 114 which engage with the grooves 10 in the first section 22.

In order to release the first section 22 of the SDS plus shank from the tool holder, the twisting sleeve 206 is rotated against the biasing force of the spring until it is located in its first end position. When the twisting sleeve 206 is in this position, the cams 232, 242 for the positioning ball bearings 116 and the locking ball bearing 118 are located with their first locating position 234, 244 facing the ball bearings 116, 118. This allows the ball 116, 118 bearings to move to their outer most position allowing the first section 22 to pass them by and be removed from the tool holder.

The third embodiment of the tool holder will now be described with reference to FIGS. 22 to 29. Where the same features are present in third embodiment, which were present in the first, the same reference numbers have been used.

The tool holder comprises the front end 102 of the spindle, a first inner sleeve 104 and a second outer sleeve 106.

Figure 23:
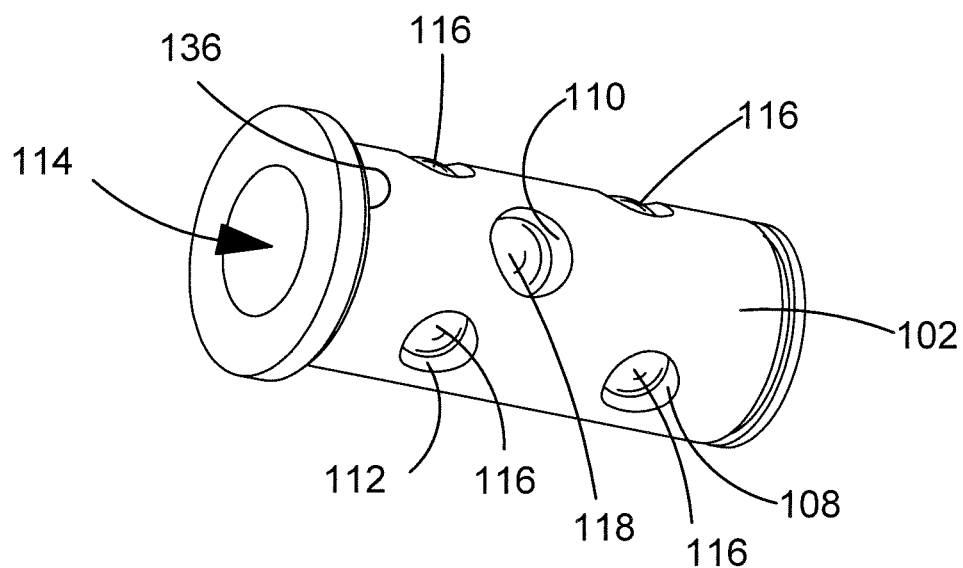
FIG. 23 shows the front end of the spindle of a hammer drill with the positioning ball bearings and locking ball bearing in their respective apertures.

FIG. 23 shows the tubular front end 102 of the spindle 100 which is formed by a wall of uniform thickness except for a fat surface 300 formed on one side along the length at the front end 102. The front end 102 comprises seven circular apertures 108, 110, 112 formed through the side walls of the front end 102. The apertures 108, 110, 112 are arranged in two sets of three 108, 112 with the seventh 110 located between the two sets 108, 112. Each set 108, 112 of three comprises three apertures located at the same axial position as each other along the spindle and arranged angularly about the longitudinal axis of the front end 102 at 120 degrees relative to each other in a symmetrical fashion. The apertures 108, 112 in each set are angularly aligned with the apertures in the other set 108, 110. The diameter of each aperture 108, 112 in both sets are all the same as each other. The seventh aperture 110 is located axially between the two sets 108, 112 and angularly between two adjacent apertures in each set. The diameter of the seventh aperture is slightly larger than that of the six apertures in the two sets 108, 112.

Six positioning ball bearings 116 are located within the two sets 108, 112 of three apertures, each having the same diameter. The diameter of the cross section of each of the six apertures 108, 112 is slightly reduced at the entrance to the six apertures 108, 112 formed in the inner wall of the front end 102 where the apertures 108, 112 meet the tubular passage 114 to prevent the positioning ball bearings 116 from exiting the apertures 108, 112 and entering the tubular passage 114 whilst allowing part of the sides of positioning ball bearings 116 to project into the tubular passage 114 from the apertures. The diameter of each of the support ball bearings 116 is greater than the thickness of the wall of the front end 102 and therefore a part of the sides of the positioning ball bearings 116 either project into the tubular passage 114 or project radially outwardly from the front end 102.

A seventh locking ball bearing 118 is located within the seventh aperture 110. The diameter of the seventh ball bearing 118 is larger than that of the six positioning ball bearings 116. The diameter of the cross section of each of the seventh aperture 110 is slightly reduced at the entrance to the seventh aperture 110 formed in the inner wall of the front end 102 where the aperture 110 meets the tubular passage 114 to prevent the ball bearing 118 from exiting the aperture 110 and entering the tubular passage 114 whilst allowing part of the side of the locking ball bearing 118 to project into the tubular passage 114 from the aperture 110. The diameter of the ball bearing 118 is greater than the thickness of the front end 102 and therefore a part of the side of the ball bearing 118 either projects into the tubular passage 114 or projects radially outwardly from the front end 102.

Figure 24:
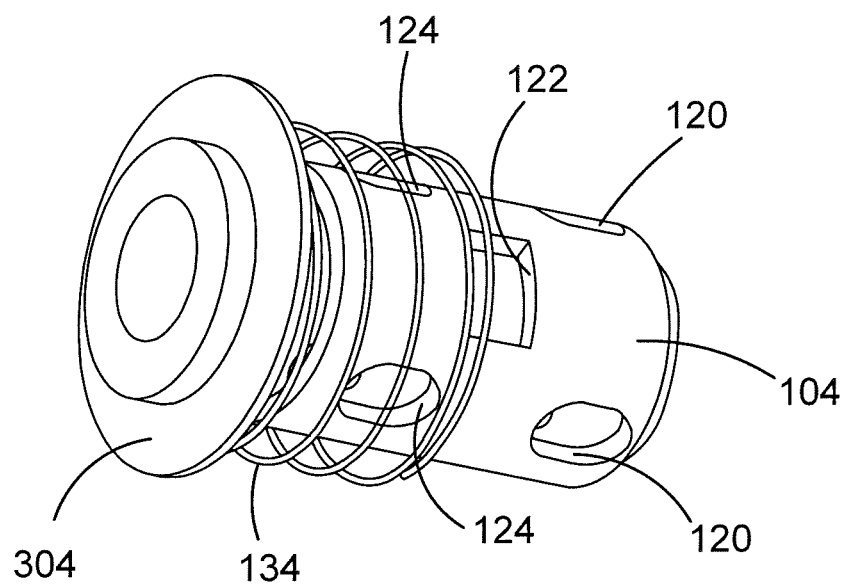
FIG. 24 shows the first inner sleeve mounted on the front end of the spindle together with the biasing spring and support washer.

FIG. 24 shows the first inner sleeve 104 mounted on the front end 102. The first inner sleeve 104 can axially slide along the front end 102. However, the first inner sleeve has a flat inner surface 302 which engages that of the front end 102 of the spindle. The engagement of the flat surfaces 300, 302 prevents the first inner sleeve 104 from rotating around the front end 102.

The first inner sleeve 104 comprises seven holes 120, 122, 124 formed through the side walls of the first inner sleeve. The holes 120, 122 124 are arranged in two sets of three 120, 124 with the seventh 122 located between the two sets 120, 124.

Each set 120, 124 of three comprises three holes located at the same axial position as each other along the sleeve 104 and arranged angularly about the axis of the first inner sleeve 104 at 120 degrees relative to each other in a symmetrical fashion. The holes 120, 124 in each set are angularly aligned with the holes in the other set 120, 124. The shape of the cross section of the six holes 120, 124 is that of an oval with the longer side extending axially along the inner sleeve 104. The width of the holes 120, 124 in the lengthwise direction remains substantially constant and is that same as that of the diameter of the apertures 108, 112 for the positioning ball bearings 116 in the front end 102. The dimensions of each hole 120, 124 in both sets are all the same as each other. The location of the holes 120, 124 on the first inner sleeve 104 correspond to those of the apertures 108, 112 for the positioning ball bearings 116 in the front end 102 of the spindle 102 so that, when the first inner sleeve 104 is in a particular axial position on the front end 102, the holes, 120, 122, 124 and apertures 108, 110, 112 become aligned.

The seventh hole 122 is located axially between the two sets 120, 124 and angularly between two adjacent holes in each set. The shape of the cross section of the seventh hole 122 is that of a rectangle with the longer side extending circumferentially around the inner sleeve 104. The width of the holes 120, 124 in the lengthwise direction remains substantially constant and is slightly larger than that of the diameter of the seventh aperture 110 in the front end 102.

Figure 25:
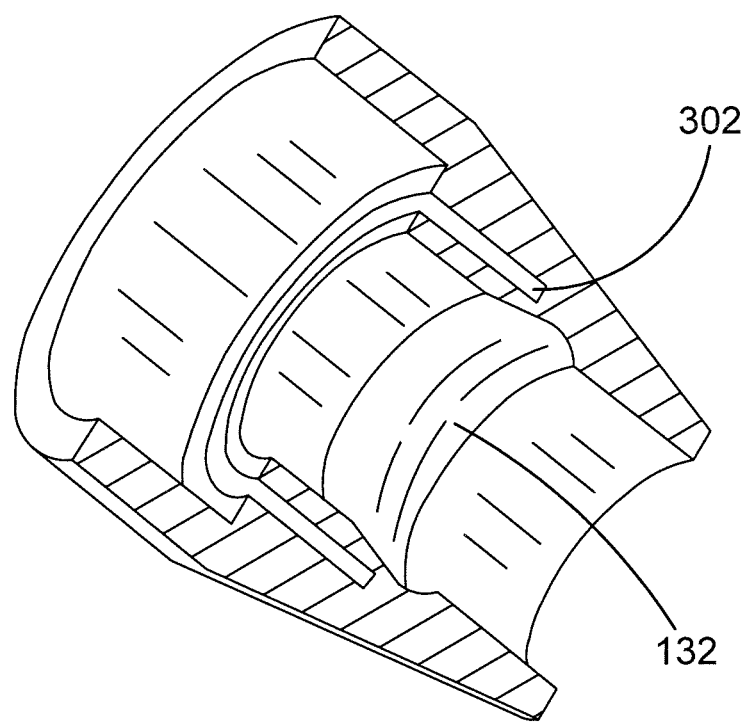
FIG. 25 shows the inside view of the second outer sleeve with the radial groove.
Figure 26A:
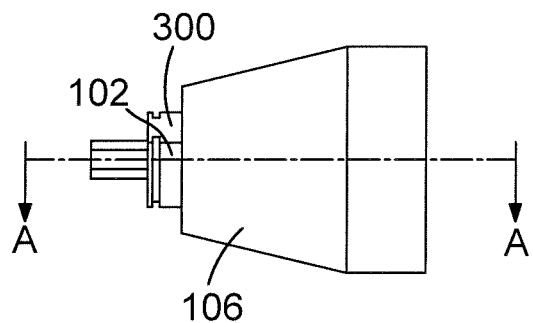
FIG. 26A shows a side view of the tool holder with the first section of a hex shank cutting tool being inserted into the tool holder with the second outer sleeve in the released position.
Figure 26B:
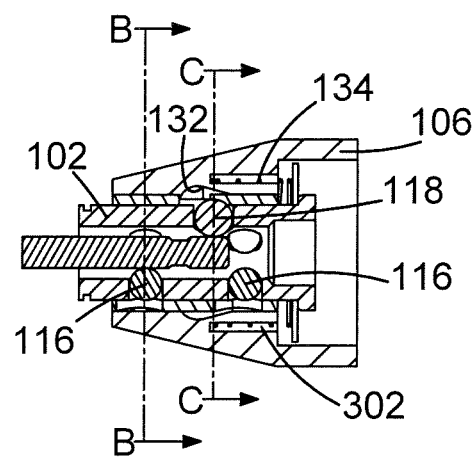
FIG. 26B shows a cross section of tool holder of FIG. 26A in the direction of Arrows A.
Figure 26C:
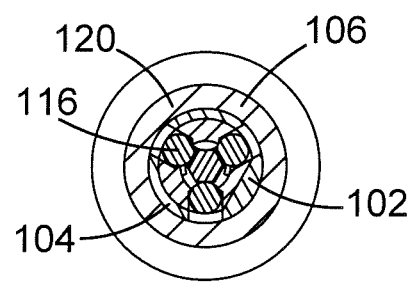
FIG. 26C shows a cross section of tool holder of FIG. 26B in the direction of Arrows B through the front positioning ball bearings.
Figure 26D:
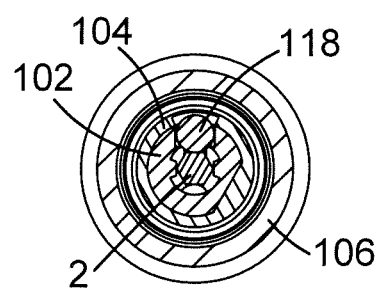
FIG. 26D shows a cross section of tool holder of FIG. 26B in the direction of Arrows C through the locking ball bearing.
Figure 27A:
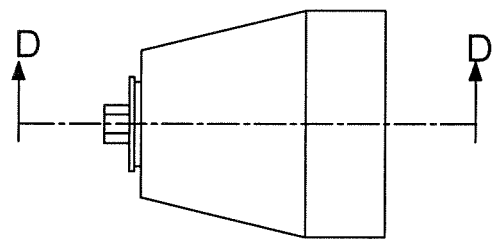
FIG. 27A shows a side view of the tool holder with the first section of a hex shank cutting tool located within the tool holder with the second outer sleeve in the locked position.
Figure 27B:
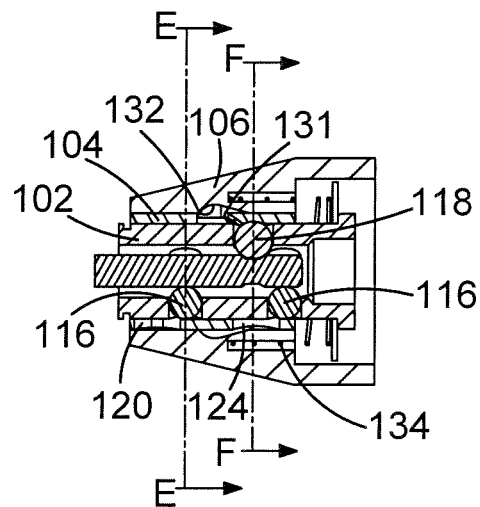
FIG. 27B shows a cross section of tool holder of FIG. 27A in the direction of Arrows D.
Figure 27C:
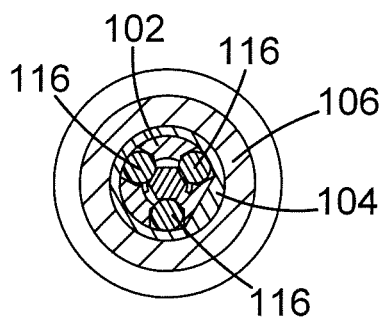
FIG. 27C shows a cross section of tool holder of FIG. 27B in the direction of Arrows E through the front positioning ball bearings.
Figure 27D:
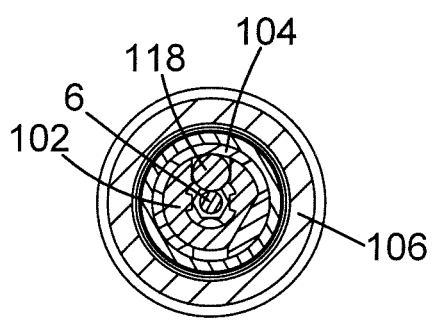
FIG. 27D shows a cross section of tool holder of FIG. 27B in the direction of Arrows F through the locking ball bearing.
Figure 28A:
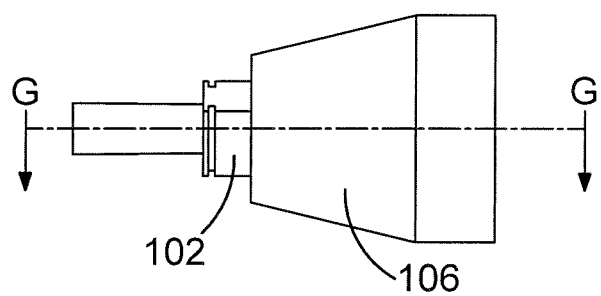
FIG. 28A shows a side view of the tool holder with the first section of a SDS plus shank cutting tool being inserted within the tool holder with the second outer sleeve in the released position.
Figure 28B:
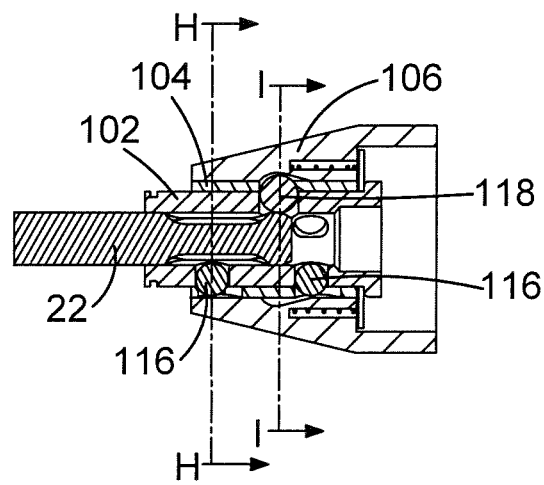
FIG. 28B shows a cross section of tool holder of FIG. 28A in the direction of Arrows G.
Figure 28C:
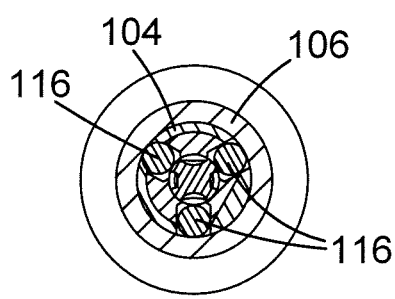
FIG. 28C shows a cross section of tool holder of FIG. 28B in the direction of Arrows H through the front positioning ball bearings.
Figure 28D:
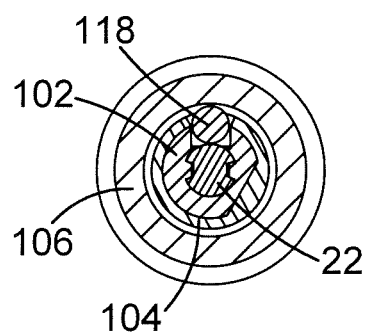
FIG. 28D shows a cross section of tool holder of FIG. 28B in the direction of Arrows I through the locking ball bearing.
Figure 29A:
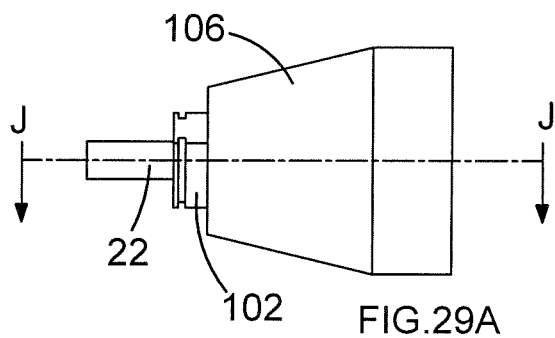
FIG. 29A shows a side view of the tool holder with the first section of a SDS plus shank cutting tool located within the tool holder with the second outer sleeve in the locked position.
Figure 29B:
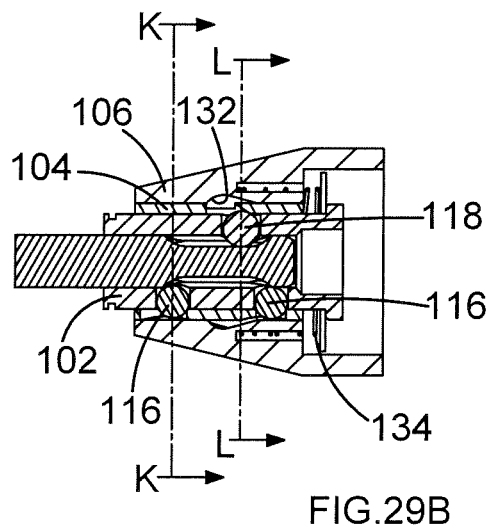
FIG. 29B shows a cross section of tool holder of FIG. 29A in the direction of Arrows J.
Figure 29C:
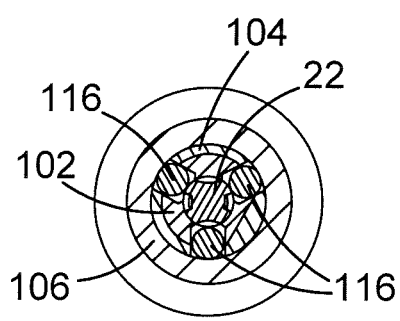
FIG. 29C shows a cross section of tool holder of FIG. 29B in the direction of Arrows K through the front positioning ball bearings.
Figure 29D:
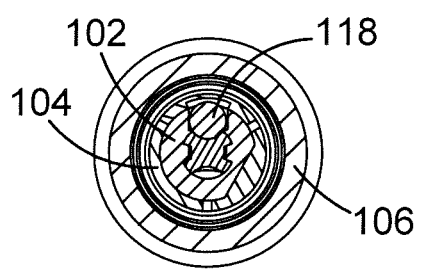
FIG. 29D shows a cross section of tool holder of FIG. 29B in the direction of Arrows L through the locking ball bearing.

The second outer sleeve 106 is rigidly mounted onto the first inner sleeve 104. Formed in the inner wall 130 of the outer sleeve is a radial groove 132 as best seen in FIG. 25. The depth of the groove 132 across the width of the groove 132 in an in axial direction of the outer sleeve 106 increases in the forward direction (as shown in FIG. 26B), the shape of the cross section of the width of the grove 132 remaining constant along the length of the groove 132 around the inner wall of the second outer sleeve 106. When the second outer sleeve 106 is mounted on the first inner sleeve 104, the groove 132 aligns with and faces towards the seventh hole 122 in the inner sleeve. The width of the groove 132 is greater than the width of the seventh hole 122.

A spring 134 is sandwiched between a washer 304 which abuts against a shoulder 136 on the spindle 100 and the base of a circular groove 306 formed inside of the outer sleeve 106, biasing the inner and outer sleeves 104, 106 in a forward direction.

The seventh hole 122 aligns with the seventh aperture 110 when the inner and outer sleeves 104, 106 are at a rearward axial position on the front end 102.

The inner and outer sleeves 102 can be axially slid between one of two axial end positions on the front end 102, a first rearward axial position where the seventh hole 122 in the inner sleeve 104 is aligned with the seventh aperture 110 of the front end 102 and a second forward position where the seventh hole 122 in the inner sleeve 104 is offset relative to the seventh aperture 110 of the front end 102. When the inner and outer sleeves 104, 106 are axially slid to the rearward axial end position on the front end 102, the six apertures 108, 112 of the front end 102 and the six holes 120, 124 of the inner sleeve 104 are also aligned. When the inner and outer sleeves 102 are axially slid to the forward axial end position on the front end 102, the six apertures 108, 112 of the front end 102 and the six holes of the inner sleeve are off set. Similarly, when the inner and outer sleeves 102 are axially slid to the forward axial end position on the front end 102, the seventh aperture 110 of the front end 102 and the seventh hole 122 of the inner sleeve are off set.

When all the holes 120, 122, 124 are aligned with the apertures 108, 110, 112 when the sleeves are in their rearward axial position, a part of the side of the ball bearings 116, 118 can either project from the apertures 108, 110, 112 into the tubular passage 114 or project radially outwardly from the apertures 108, 110, 112 in the front end 102 and into the holes 120 122, 124 and groove 132. When the holes 120, 122, 124 are offset relative the apertures 108, 110, 112 when the sleeves are in their forward axial position, a part of a side of the ball bearings 116, 118 projects from the apertures 108, 110, 112 into the tubular passage 114 as are prevented from projecting radially outwardly from the apertures 108, 110, 112 in the front end 102 by the inner wall of the inner sleeve 104, the inner wall of the inner sleeve 104 holding the ball bearings 116, 118 in their inner position.

The insertion of a first section of the hex shank cutting tool will now be described with reference to FIGS. 26 and 27.

When the inner and outer sleeves 104, 106 are slid to their rearward position against the biasing force of the spring 134, the first section 20 of the hex shank is inserted into the tubular passage 114. In the rearward position, all of the apertures 108, 110, 112 and the holes 120, 122 124 are aligned and therefore, the ball bearings 116, 118 can move to their outer most positions, allowing the first section to pass by. The force applied to inner and outer sleeves 104, 106 is then removed, allowing the inner and outer sleeves 104, 106 to slide forward to their forward position due to the biasing force of the spring 134. When the sleeves 104, 106 are in their forward position, the holes 108, 110, 112 and apertures 120, 122, 124 are offset. When they are off set, the ball bearings 116, 118 are urged inwardly and held in this position, the positioning ball bearings 116 engaging with the flat surfaces 140 of sides of the first section 20 and the locking ball bearing 118 engaging with the groove 6. The spring 234 holds the sleeves in their forward position, ensuring the holes 108, 110, 112 and apertures 120, 122 124 are offset and therefore locking the ball bearings 116, 118 in their inner position. The positioning ball bearings 116 prevent movement of the first section in a direction perpendicular to the longitudinal axis of the cutting tool. The locking ball bearing 118 axially locks the first section 20 within the tubular passage 114. Rotational movement of the tool holder is transferred to the first section via the positioning ball bearings 116 and their engagement with the flat surfaces 140 of the first section 20.

In order to release the first section of the hex shank from the tool holder, the inner and outer sleeves are slid rearwardly against the biasing force of the spring until it is located in its rearward end position. When the sleeves are in this position, the apertures and holes are aligned, allowing the ball bearings to move to their outer most position allowing the first section to pass by and be removed from the tool holder.

The insertion of a first section of the SDS plus shank cutting tool will now be described with reference to FIGS. 28 and 29.

When the inner and outer sleeves 104, 106 are slid to their rearward position, the first section 22 of the SDS shank is inserted into the tubular passage 114. As the apertures 108, 110, 112 and the holes 120, 122, 124 are aligned, the ball bearings 116, 118 can move to their outer most position allowing the first section 222 to pass by (as shown in FIGS. 28A to 28D). The force applied to the inner and outer sleeves 104, 106 is then removed, allowing the inner and outer sleeves 104, 106 to slide forward due to the biasing force of the spring 134. The inner and outer sleeves 104, 106 slide to an intermediate position between the rearward position and the forward position (as shown FIGS. 29A to 29D). In this position, the six apertures 108, 112 for the positioning ball bearings 116 and the six corresponding holes 120, 124 remain aligned. As such, they positioning ball bearings 116 can be located in their radially outer position in engagement in the sides of the first section 22 of the shank. However, the seventh aperture 110 and seventh hole 122 become partially offset, urging the locking ball bearing 118 into the axial recess 12 of the first section. However, as the seventh aperture 110 and seventh hole 122 are only partially offset, the locking ball bearing 118 is urged to a lesser depth than when they are totally offset. The locking ball bearing 118 is held in its inner position by the force of the spring 134. The positioning ball bearings 116 prevent movement of the first section in a direction perpendicular to the longitudinal axis of the cutting tool. The locking ball bearing 118 axially locks the first section within the tubular passage 118 (whilst allowing limited axial movement as the locking ball bearing 118 can slide within the axial recess 12). Rotational movement of the tool holder is transferred to the first section 22 via ribs 150 formed inside of the tubular passage 114 which engage with the grooves 10 in the first section 22.

In order to release the first section 22 of the SDS plus shank from the tool holder, the sleeves 104, 106 are slid back against the biasing force of the spring 134 until it is located in its rearward position. When the sleeves 104, 106 are in this position, the holes 108, 110, 112 and apertures are all aligned, allowing the ball bearings 116, 118 to move to their outer most positions allowing the first section 22 to pass them by and be removed from the tool holder.

Whilst the three embodiments describe tool holders which are integrally formed with the spindle of the hammer drill, it will be appreciated that embodiments of the invention can comprise tool holders which are constructed as separate discreet devices capable of being attached to a hammer drill.

Whilst the three embodiments of tool holder have been described in relation to holding hex shanked and a SDS plus shanked cutting tools, it will be appreciated that such a design can be utilized on other designs of shank.

The invention claimed is:

1. A tool holder for a power tool comprising:
    a body defining a passageway in which a shank of a cutting tool can be located;
    a sleeve mounted around the body, the sleeve being rotatable around the body between a first angular position and a second angular position, and axially displaceable with respect to the body between a first axial position and a second axial position;
    at least one axial locking element moveably mounted within the body, wherein, in the first axial position of the sleeve, the at least one axial locking element is radially moveable between a first radial position and a second radial position with respect to a longitudinal axis of the passageway to allow passage of a portion of the cutting tool shank into the passageway, and in the second axial position of the sleeve, the at least one axial locking element is locked in the first radial position where the at least one axial locking element projects at least partially into the passageway to engage a groove of the cutting tool shank and axially restrict the movement of the cutting tool shank; and
    at least one axial guide moveably mounted within the body, wherein, in the first angular position of the sleeve, the axial guide is radially locked into a first radial position with respect to the longitudinal axis of the passageway in which the at least one axial guide projects at least partially into the passageway where it is positioned and configured to engagingly support a side of the cutting tool shank of the first type when the cutting tool shank of the first type is located within the passageway, and in the second angular position of the sleeve, the axial guide is radially moveable between the first radial position and a second radial position and to engagingly support a side of the cutting tool shank of the second type when the cutting tool shank of the second type is located within the passageway.

2. The tool holder as claimed in claim 1 wherein the at least one axial locking element is moveably mounted within the body so that the at least one axial locking element is moveable between at least three positions, including a first release position and at least two locking positions in which the at least one axial locking element projects into the passageway by differing amounts, wherein, in a first locking position of the two locking positions, the at least one axial locking element is positioned and configured to engage the circumferential groove of the cutting tool shank of the first type, and in a second locking position of the two locking positions, the at least one axial locking element is positioned and configured to engage the axial recess of the cutting tool shank of the second type.

3. The tool holder as claimed in claim 1 wherein the at least one locking element and the at least one axial guide are configured to move between their positions in one or more of independently of each other, simultaneously with each other, and separately to each other.

4. The tool holder as claimed in claim 1 wherein the at least one locking element and the at least one axial guide are configured to move by differing amounts when they move between positions.

5. The tool holder as claimed in claim 1 wherein the body comprises an elongate tube.

6. The tool holder as claimed in claim 1 wherein the sleeve is configured to selectively hold one or more of the least one axial locking element and the at least one axial guide in at least one of their positions.

7. The tool holder as claimed in claim 1 wherein the body comprises a wall having a first aperture corresponding to the at least one locking element and a second aperture corresponding to the at least one axial guide, wherein the at least one locking element is radially moveable into the first aperture in its second radial position, and the at least one axial guide is radially movable in its second radial position.

8. The tool holder as claimed in claim 7 wherein the dimensions of the at least one axial locking element and the at least one axial guide element are respectively greater than lengths of the first aperture and the second aperture.

9. The tool holder as claimed in claim 8, wherein the sleeve comprises at least one recess configured to be selectively offset relative to the first aperture in the first angular position of the sleeve and aligned with the first aperture in the second angular position of the sleeve, the at least one locking element being configured to selectively move at least partly into one of the at least one recess.

10. The tool holder as claimed in claim 9 wherein the sleeve is configured to be axially slidable on the body to align or offset the at least one recess with the at least one aperture.

11. The tool holder as claimed in claim 9 wherein the sleeve is configured to be rotatable around the body to align or offset the at least one recess with the at least one aperture.

12. The tool holder as claimed in claim 7, wherein the first aperture extends along the longitudinal axis of the passageway, and the second aperture extends perpendicularly to the first aperture.

13. The tool holder as claimed in claim 1 wherein there is provided a least one cam moveably mounted on the body, the cam being configured to selectively move and/or hold the least one axial locking element and/or the at least one axial guide element in at least one of their positions.

14. The tool holder as claimed in claim 13 wherein the at least one cam is rotationally mounted on the body.

15. The tool holder as claimed in claim 13 wherein different cams are used to move the least one axial locking element and the at least one axial guide element.

16. The tool holder as claimed in claim 15, further comprising a sleeve which is rigidly attached to the different cams and which is configured to move the cams relative to the body in a unified manner.

17. The tool holder as claimed in claim 1 wherein one or more of the at least one locking element and the at least one axial guide comprises a ball bearing.

18. The tool holder as claimed in claim 1 wherein there are at least two sets of three axial guides, including a first set located at a first axial position along the passageway and a second set located at a second axial position along the passageway, the axial guides in each set being angularly located around the longitudinal axis of the passageway in a symmetrical manner at 120 degree angular positions relative to each other.

19. The tool holder as claimed in claim 18 wherein the axial guides in one set are angularly aligned with the axial guides in the other set.

20. The tool holder as claimed in claim 18 wherein the at least one locking element is located axially along the passageway between the two sets of axial guides.

21. The tool holder as claimed in claim 18 wherein the at least one locking element is located angularly within the passageway between the two adjacent axial guides of at least one set.

22. The tool holder as claimed in claim 18 wherein the body comprises a wall through which are is formed a plurality of apertures which face into the passageway and in one of which is located the at least one locking element and in each of the others of which are located the associated axial guides, the at least one locking element or the axial guides being configured to be selectively moved between their various positions within the aperture in which they are located.

23. The tool holder as claimed in claim 1 wherein the body comprises a front part of a spindle of a hammer drill.

24. The tool holder as claimed in claim 1, wherein the at least one axial locking element is locked in the first radial position to engage a circumferential groove of a cutting tool shank of a first type when the cutting tool shank of the first type is located within the passageway, and to engage an axial recess of a cutting tool shank of a second type when cutting tool shank of the second type is located within the passageway, in order to axially restrict the movement of the cutting tool shank of the first type or the cutting tool shank of the second type in the passageway.

* * * * *

UNITED STATES PATENT AND TRADEMARK OFFICE
CERTIFICATE OF CORRECTION

PATENT NO. : 9,999,968 B2
APPLICATION NO. : 14/742787
DATED : June 19, 2018
INVENTOR(S) : Shinthujan Selvanayagam and Markus Rompel Page 1 of 1

It is certified that error appears in the above-identified patent and that said Letters Patent is hereby corrected as shown below:

On the Title Page

Column 1, in (73) Assignee: delete "Becker" and insert -- Decker -- therefor

Signed and Sealed this
Eleventh Day of December, 2018

Andrei Iancu
*Director of the United States Patent and Trademark Office*